US012517626B2

United States Patent
Smetanin et al.

(10) Patent No.: US 12,517,626 B2
(45) Date of Patent: Jan. 6, 2026

(54) STICKER SEARCH ICON WITH MULTIPLE STATES

(71) Applicant: Snap Inc., Santa Monica, CA (US)

(72) Inventors: Sergey Smetanin, London (GB); Dor Ayalon, Glasgow (GB); Vladimir Gordienko, London (GB); Roman Golobokov, London (GB); Ivan Babanin, London (GB); Timur Zakirov, London (GB); Nikita Demidov, London (GB); Aleksandr Larionov, London (GB); Anna Kovalenko, London (GB); Nikita Belosludtcev, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/209,144

(22) Filed: Jun. 13, 2023

(65) Prior Publication Data

US 2024/0419295 A1    Dec. 19, 2024

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *H04L 51/046* (2013.01); *H04L 51/10* (2013.01)

(58) Field of Classification Search
CPC . G06F 3/04817; G06F 3/0482; H04L 51/046; H04L 51/10
(Continued)

(56) References Cited

U.S. PATENT DOCUMENTS 5,604,843 A    2/1997  Shaw et al.
5,689,559 A    11/1997 Park
(Continued)

FOREIGN PATENT DOCUMENTS

CN    109863532    6/2019
CN    110168478    8/2019
(Continued)

OTHER PUBLICATIONS

"U.S. Appl. No. 18/183,794, Non Final Office Action mailed Sep. 19, 2023", 12 pgs.
(Continued)

*Primary Examiner* — Stephen S Hong
*Assistant Examiner* — Broderick C Anderson
(74) *Attorney, Agent, or Firm* — Schwegman Lundberg & Woessner, P.A.

(57) ABSTRACT

Examples described herein relate to techniques for facilitating selection of stickers for inclusion in messages within the context of an interaction system. According to some examples, sticker selection history data of a user of an interaction application is retrieved. Absence of a sticker suggestion trigger with respect to a messaging interface of the interaction application is detected. Presence of the sticker suggestion trigger results in presentation of a suggested sticker for transmission via the messaging interface. Based on the sticker selection history data and the absence of the sticker suggestion trigger, a sticker search icon state is selected. A search icon corresponding to the sticker search icon state is caused to be presented within the messaging interface.

20 Claims, 13 Drawing Sheets

(51) Int. Cl.
*H04L 51/046* (2022.01)
*H04L 51/10* (2022.01)

(58) Field of Classification Search
USPC .................................................... 715/753
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,659,405 B1 | 5/2020 | Chang et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,502,983 B2 | 11/2022 | Heikkinen et al. |
| 12,149,489 B2 | 11/2024 | Golobokov et al. |

(56) References Cited

U.S. PATENT DOCUMENTS

| | | |
|---|---|---|
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0125811 A1* | 5/2010 | Moore ................ H04M 1/7243 715/846 |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0046423 A1 | 2/2015 | Weeks |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0039406 A1* | 2/2018 | Kong ................ G06F 3/03547 |
| 2018/0047200 A1 | 2/2018 | O'hara et al. |
| 2018/0083898 A1* | 3/2018 | Pham ................ G06F 40/56 |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2019/0286648 A1* | 9/2019 | Wan ................ G06F 16/51 |
| 2020/0259948 A1 | 8/2020 | Keohane et al. |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0383251 A1 | 12/2021 | Osborn et al. |
| 2021/0385179 A1* | 12/2021 | Heikkinen ............ H04W 4/12 |
| 2021/0385180 A1 | 12/2021 | Al Majid et al. |
| 2021/0397645 A1* | 12/2021 | Wang ................ G06F 18/22 |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0269354 A1* | 8/2022 | Prasad ................ H04L 51/04 |
| 2022/0269733 A1 | 8/2022 | Li et al. |
| 2022/0337540 A1 | 10/2022 | Bayer et al. |
| 2024/0314091 A1 | 9/2024 | Golobokov et al. |
| 2024/0403354 A1* | 12/2024 | Jagadeesh ............ G06V 20/70 |
| 2024/0422113 A1 | 12/2024 | Smetanin et al. |
| 2025/0055818 A1 | 2/2025 | Golobokov et al. |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

"U.S. Appl. No. 18/209,130, Non Final Office Action mailed Oct. 19, 2023", 12 pgs.

"U.S. Appl. No. 18/183,794, Response filed Nov. 3, 2023 to Non Final Office Action mailed Sep. 19, 2023", 12 pgs.

"U.S. Appl. No. 18/183,794, Final Office Action mailed Jan. 8, 2024", 13 pgs.

"U.S. Appl. No. 18/209,130, Response filed Jan. 17, 2024 to Non Final Office Action mailed Oct. 19, 2023", 11 pgs.

"U.S. Appl. No. 18/183,794, Response filed Jan. 30, 2024 to Final Office Action mailed Jan. 8, 2024", 14 pgs.

"U.S. Appl. No. 18/209,130, Final Office Action mailed Feb. 20, 2024", 15 pgs.

"U.S. Appl. No. 18/183,794, Non Final Office Action mailed Mar. 12, 2024", 14 pgs.

"U.S. Appl. No. 18/209,130, Response filed Apr. 22, 2024 to Final Office Action mailed Feb. 20, 2024", 11 pgs.

"U.S. Appl. No. 18/183,794, Response filed May 6, 2024 to Non Final Office Action mailed Mar. 12, 2024", 12 pgs.

"Bitmoji Customize text", [Online] Retrieved from the Internet: URL: https: web.archive.org web 20210225200456 https: support.bitmoji.com hc en-us articles 360034632291-Customize-Text-on-Bitmoji-Stickers, (captured Feb. 25, 2021), 3 pgs.

(56) References Cited

OTHER PUBLICATIONS

"Bitmoji Chrome Extension", [Online] Retrieved from the Internet: URL: https: web.archive.org web 20200919024925 https: support. bimoji.com hc en-us articles 360001494066, (Sep. 19, 2020), 5 pgs.

"Bitmoji", Snapchat Support, [Online] Retrieved from the Internet: URL: https: web.archive.org web 20190503063620 https: support. snapchat.com en-us a bitmoji, (captured May 3, 2019), 2 pgs.

"Manage Your Bitmoji", Snapchat Support, [Online] Retrieved from the Internet: URL: https: web.archive.org web 20190503063620 https: support.snapchat.com en-us a manage-bitmoji, (captured May 3, 2019), 3 pgs.

"Bitmoji Family", Snapchat Support, [Online] Retrieved from the Internet: URL: https: web.archive.org web 20190503063620 https: support.snapchat.com en-us article bitmoji-family, (captured May 3, 2019), 4 pgs.

"Your Own Personal Emoji", Bitstrips Inc, [Online] Retrieved from the Internet: URL: https: web.archive.org web 20150205232004 http: bitmoji.com , (captured Feb. 5, 2015), 3 pgs.

"Instant Comics Starring You and Your Friends", Bitstrips Inc, [Online] Retrieved from the Internet: URL: https: web. archive.org web 20150206000940 http: company.bitstrips.com bitstrips-app. html, (captured Feb. 6, 2015), 3 pgs.

Carnahan, Daniel, "Snap is Offering Personalized Video Content Through Bitmoji TV", Business Insider, [Online] Retrieved from the Internet: URL: https: www.businessinsider.com snap-offers-personalized-video-content-through-bitmoji-tv-2019-12, (2019), 10 pgs.

Constine, Josh, "Snapchat launches Bitmoji merch and comic strips starring your avatar", TechCrunch, [Online] Retrieved from the Internet: URL: https: techcrunch.com 2018 11 13 bitmoji-store , (Nov. 13, 2018), 16 pgs.

Constine, Josh, "Snapchat Launches Bitmoji TV: Zany 4-min Cartoons of Your Avatar", TechCrunch, [Online] Retrieved from the Internet: URL: https: techcrunch.com 2020 01 30 bitmoji-tv , (Jan. 30, 2020), 13 pgs.

Kuhn, Steve, "How To Send Stickers on Snapchat?", ITGeared, [Online]. Retrieved from the Internet: URL: https: www.itgeared. com how-to-send-stickers-on-snapchat , (Aug. 31, 2022), 6 pgs.

Macmillan, Douglas, "Snapchat Buys Bitmoji App for More Than $100 Million", The Wallstreet Journal, [Online] Retrieved from the Internet: URL: https: www.wsj.com articles snapchat-buys-bitmoji-app-for-more-than-100- million-1458876017, (Mar. 25, 2016), 5 pgs.

Newton, Casey, "Your Snapchat friendships now have their own profiles—and merchandise", The Verge, [Online] Retrieved from the Internet: URL: https: www.theverge.com 2018 11 13 18088772 snapchat-friendship-profiles-bitmoji-merchandise-comics, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: URL: https: www.theverge.com 2018 1 30 16949402 bitmoji-deluxe-snapchat-customization, (Jan. 30, 2018), 2 pgs.

Reign, Ashley, "How To Add My Friend's Bitmoji To My Snapchat", Women.com, [Online] Retrieved from the Internet: URL: https: www.women.com ashleyreign lists how-to-add-my-friends-bitmoji-to-my-snapchat, (Jun. 30, 2017), 7 pgs.

Tumbokon, Karen, "Snapchat Update: How To Add Bitmoji To Customizable Geofilters", International Business Times, [Online] Retrieved from the Internet : URL: https: www.ibtimes.com snapchat-update-how-add-bitmoji-customizable-geofilters-2448152, (Nov. 18, 2016), 6 pgs.

"U.S. Appl. No. 18/183,794, Final Office Action mailed May 31, 2024", 7 pgs.

"U.S. Appl. No. 18/183,794, Notice of Allowance mailed Jul. 11, 2024", 7 pgs.

"U.S. Appl. No. 18/183,794, Response filed Jun. 13, 2024 to Final Office Action mailed May 31, 2024", 11 pgs.

"U.S. Appl. No. 18/209,130, Advisory Action mailed Jun. 14, 2024", 3 pgs.

"U.S. Appl. No. 18/209,130, Response filed Jun. 14, 2024 to Advisory Action mailed Jun. 14, 2924", 11 pgs.

"U.S. Appl. No. 18/209,130, Examiner Interview Summary mailed Feb. 4, 2025", 2 pgs.

"U.S. Appl. No. 18/209,130, Non Final Office Action mailed Nov. 15, 2024", 14 pgs.

U.S. Appl. No. 18/929,410, filed Oct. 28, 2024, Techniques for Recommending Reply Stickers.

U.S. Appl. No. 18/740,912, filed Jun. 12, 2024, Automatic Evaluation of Sticker Recommendations.

"U.S. Appl. No. 18/209,130, Response filed Jun. 12, 2025 to Advisory Action mailed May 28, 2025", 12 pgs.

"U.S. Appl. No. 18/209,130, Notice of Allowance mailed Aug. 26, 2025", 8 pgs.

"U.S. Appl. No. 18/209,130, Final Office Action mailed Mar. 18, 2025", 14 pgs.

"U.S. Appl. No. 18/209,130, Response filed Feb. 14, 2025 to Non Final Office Action mailed Nov. 15, 2024", 11 pgs.

"U.S. Appl. No. 18/209,130, Response filed May 15, 2025 to Final Office Action mailed Mar. 18, 2025", 12 pgs.

\* cited by examiner

STICKER SEARCH ICON WITH MULTIPLE STATES

TECHNICAL FIELD

The present disclosure relates to techniques for facilitating selection of stickers in the context of an interaction system that provides a messaging application or service.

BACKGROUND

Advances in a variety of computer-related technologies have given rise to several online or Internet-based interaction applications that provide messaging functionality. Traditional messaging systems and applications, such as e-mail or conventional text messaging, are quickly being replaced or supplemented with new messaging applications that provide for generating and communicating with rich content—e.g., content that incorporates a variety of different media formats, including text, audio, graphics, images, animations, photographs, video, augmentations, and/or effects. One media format that has become increasingly popular is the digital sticker, more frequently referred to simply as a sticker.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
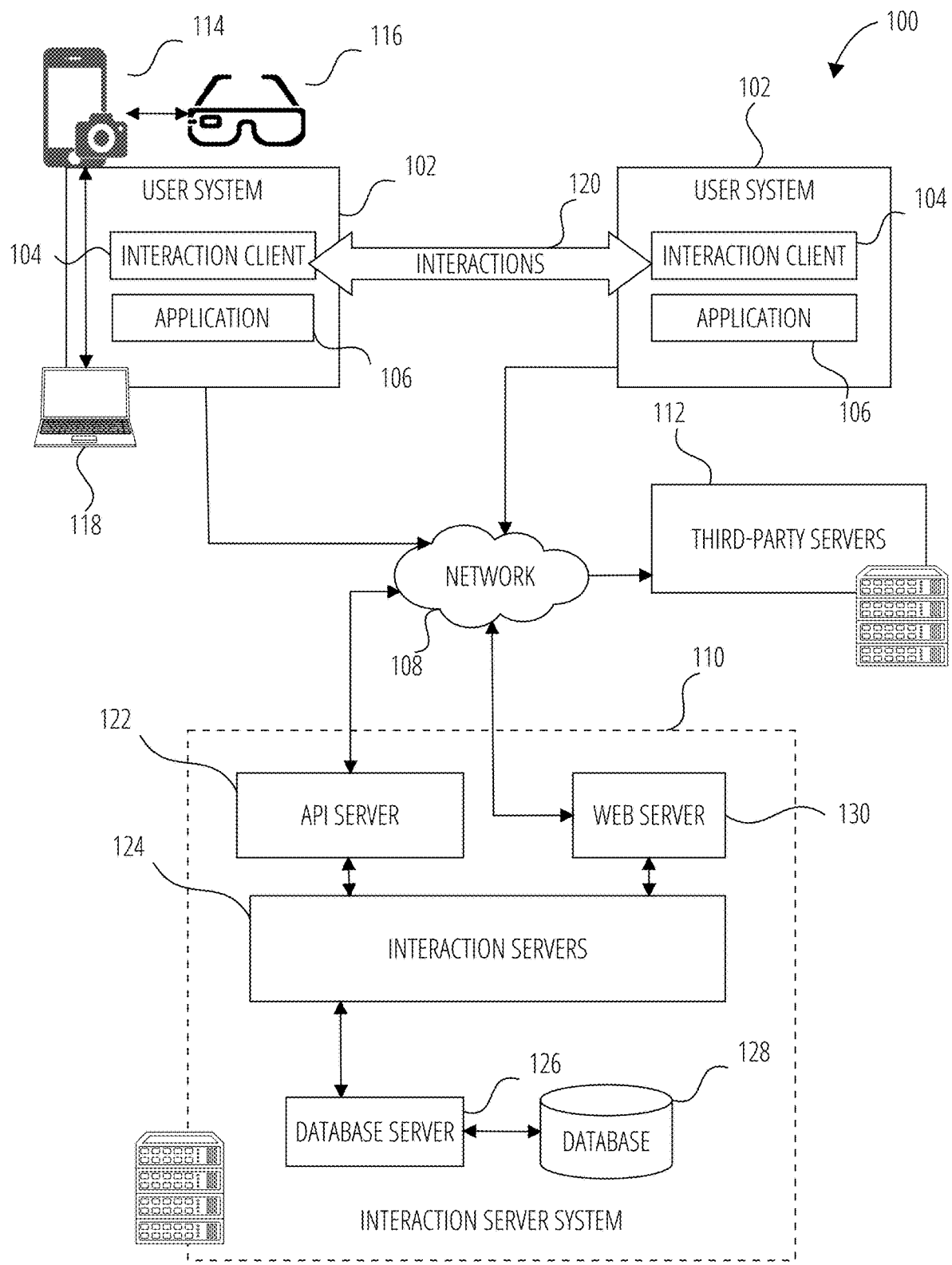
FIG. 1 is a diagrammatic representation of a networked environment in which the present disclosure may be deployed, according to some examples.

For purposes of the present disclosure, the terms "message" and "media content item" are used synonymously. As will be readily apparent from the description of the various figures that follow, a message or media content item may consist of one or various component parts—that is, individual content items, including, for example, text, audio, graphics, images, animations, photographs, video, augmentations, and/or effects. Interaction applications can provide for the exchange of messages in both a one-to-one (e.g., direct messaging) context, as well as a one-to-many context. In the case of one-to-many messaging, an interaction application may allow a sending user to specify or select multiple receiving users to receive a message (or, in the case of a messaging group, messages may automatically be delivered to multiple receiving users).

A sticker is a graphic, icon, or image, similar in concept to an emoji. However, while a set of stickers supported by an interaction system may include emojis, the concept of a "sticker" is broader in the sense that many stickers do not correspond with and represent a predetermined symbol. For instance, whereas emojis may be part of a standardized character coding system (e.g., the Unicode Standard), the majority of stickers generally are not part of any standardized character coding system.

Implementations of sticker systems may provide greater flexibility in creating diverse and meaningful content (e.g., through customized or personalized stickers) that can be more expressive and engaging than conventional characters or emojis. Given that a sticker system utilized by an interaction application may include considerably more stickers than any conventional emoji set, it may be challenging for a sending user to identify an appropriate sticker, or quickly select a desired sticker, when composing a message to be communicated with one or more receiving users.

In creating a message, whether it be a direct message or a one-to-many message posted to a content feed, to a group of users, or to a content collection (e.g., a "story"), content creators may add to the content of the message one or more digital stickers (in some cases, the message content consists exclusively of a sticker). Typically, the stickers are maintained and managed by a sticker system that is part of, or otherwise associated with, the interaction application. In some instances, a sticker may be customized or personalized, for instance, to reflect characteristics of the content creator. For example, a sticker may comprise an avatar that has been configured by a user to convey a likeness of the user. As another example, a sticker may be an animated graphic that includes attributes of the user (e.g., the head of the user added to a predefined animation). Similarly, a sticker may be customized to reflect an attribute or characteristic of a location from which a message is being created and shared, or an event occurring at the time the message is being created and shared. Accordingly, customized and/or personalized stickers help content creators better to convey their message and improve overall engagement.

Finding the right sticker can be tedious and time-consuming, requiring the user to navigate multiple pages or tabs with information. This can be distracting and discouraging for users to implement stickers in their communications, which may result in wasted resources or time.

Examples described in the present disclosure provide a messaging interface that includes a sticker search icon with multiple states, that can address technical challenges identified herein. The messaging interface may be any interface that enables a user to compose a message, such as a conversation interface (also known as a "chat" interface). In a preview state, the sticker search icon may display a sticker that was recently used by a user in order to make a sticker feature of an interaction application more prominent. In the preview state, the sticker search icon may be a user-specific icon, such as the most recently used or selected sticker associated with the specific user. In a non-preview state, e.g., where a user does not have any recently used stickers or suggested stickers, a non-user specific icon may be presented.

When a user of an interaction application accesses a messaging interface (e.g., opens a chat window, previews, or edits a media content item to be shared with one or more receiving users, or initiates a reply message), a user-specific sticker may be presented to provide a call to action (CTA) linked to a sticker function of the interaction application. Selection of the sticker search icon may cause presentation of a sticker search panel (e.g., a "sticker drawer" or "sticker picker") that displays stickers by sticker category. Where the sticker search icon corresponds to a recently used sticker, the sticker search panel may be launched with a recent stickers section (e.g., a "recents tab"), corresponding to a recent stickers category, preselected and presented to the user.

In some examples, the preview state, in which a recent sticker is presented, is entered as a default state when certain conditions are met. These conditions may include one or more of the following: no sticker recommendation is active (e.g., no suggested sticker has been generated or there is no current sticker suggestion trigger); no other sticker is being presented as a sticker search icon; a text input field of the user is empty; or no message has been received by the user within the messaging interface (e.g., within a determinable time period).

According to some examples, a method includes receiving user input to access a messaging interface of an interaction application, and retrieving sticker selection history data of a user of the interaction application. The method includes detecting absence of a sticker suggestion trigger with respect to the messaging interface, and selecting, based on the sticker selection history data and the absence of the sticker suggestion trigger, a sticker search icon state. In some examples, the sticker search icon state is selected from among a plurality of sticker search icon states of the interaction application (e.g., including a non-preview state and a preview state, as mentioned above).

A search icon corresponding to the sticker search icon state is caused to be presented within the messaging interface. The method may include receiving user input to select the search icon within the messaging interface. Responsive to receiving the user input to select the search icon, presentation of a sticker search graphical element (e.g., a sticker search panel) may be caused within the messaging interface. The sticker search graphical element may present one or more user-selectable stickers. Accordingly, the interaction application may present a user interface via which a selection of stickers is presented, allowing the sending user composing the message to select a sticker from the available stickers for use as, or within, a message.

In some examples, the search icon presents a thumbnail of the corresponding sticker, e.g., a smaller version of the sticker that serves as a preview or representation of the larger or full-sized sticker. The use of such a search icon may enable quicker browsing, conserve bandwidth, or improve the overall user experience.

In some cases, an interaction application generates "smart" sticker suggestions, e.g., based on text added to an input field by the user, or based on the context or context of a user conversation within the messaging interface. It may be desirable to facilitate sticker selections in cases where there is no surfaced sticker suggestion. Examples of the present disclosure may thus address technical hurdles to facilitating sticker selection or usage by surfacing a sticker to a messaging interface (e.g., adjacent to the input field), based on sticker selection history data, allowing for top-level surfacing of a CTA even in cases where there is no active or available sticker suggestion.

The interaction application may dynamically switch between different search icon states. For example, in response to detecting an empty text input field and no conversation data from which to generate a suggested sticker, the interaction application may initiate a recent sticker preview state to present a recent sticker at a top level of the messaging interface (e.g., as a CTA next to the input field). Subsequently, once the user starts populating the text input field (e.g., adding words to the text input field), the interaction application may generate a suggested sticker based on the content of the text input field and transition to a suggested sticker preview state, in which the recent sticker "previewed" within the messaging interface is dynamically replaced by the suggested sticker as a new preview.

Examples of the present disclosure provide a useful sticker search and/or suggestion function. The sticker search or suggestion function may include local sticker search functionality implemented at a user device (as opposed to a server-side device), addressing technical hurdles associated with quick surfacing of meaningful sticker search icons.

When the effects in this disclosure are considered in aggregate, one or more of the methodologies described herein may obviate a need for certain efforts or resources that otherwise would be involved in the selection or application of stickers in the context of an interaction system. Computing resources used by one or more machines, databases, or networks may be more efficiently utilized or even reduced, e.g., as a result of automatic surfacing of relevant sticker content, or as a result of a reduced number of user selections or processing operations required to compose a desired message. Examples of such computing resources may include processor cycles, network traffic, memory usage, graphics processing unit (GPU) resources, data storage capacity, power consumption, and cooling capacity. Many other advantages of the present inventive subject matter will be readily apparent to those skilled in the art from the description of the several figures that follows.

Networked Computing Environment

FIG. 1 is a block diagram showing an example interaction system 100 for facilitating interactions (e.g., exchanging text messages, conducting text, audio and video calls, or playing games) over a network. The interaction system 100 includes multiple user systems 102, each of which hosts multiple applications, including an interaction client 104 (as an example of an interaction application) and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Application Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to deploy particular technology and functionality within the interaction server system 110 initially, but later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, content augmentation (e.g., filters or overlays), message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
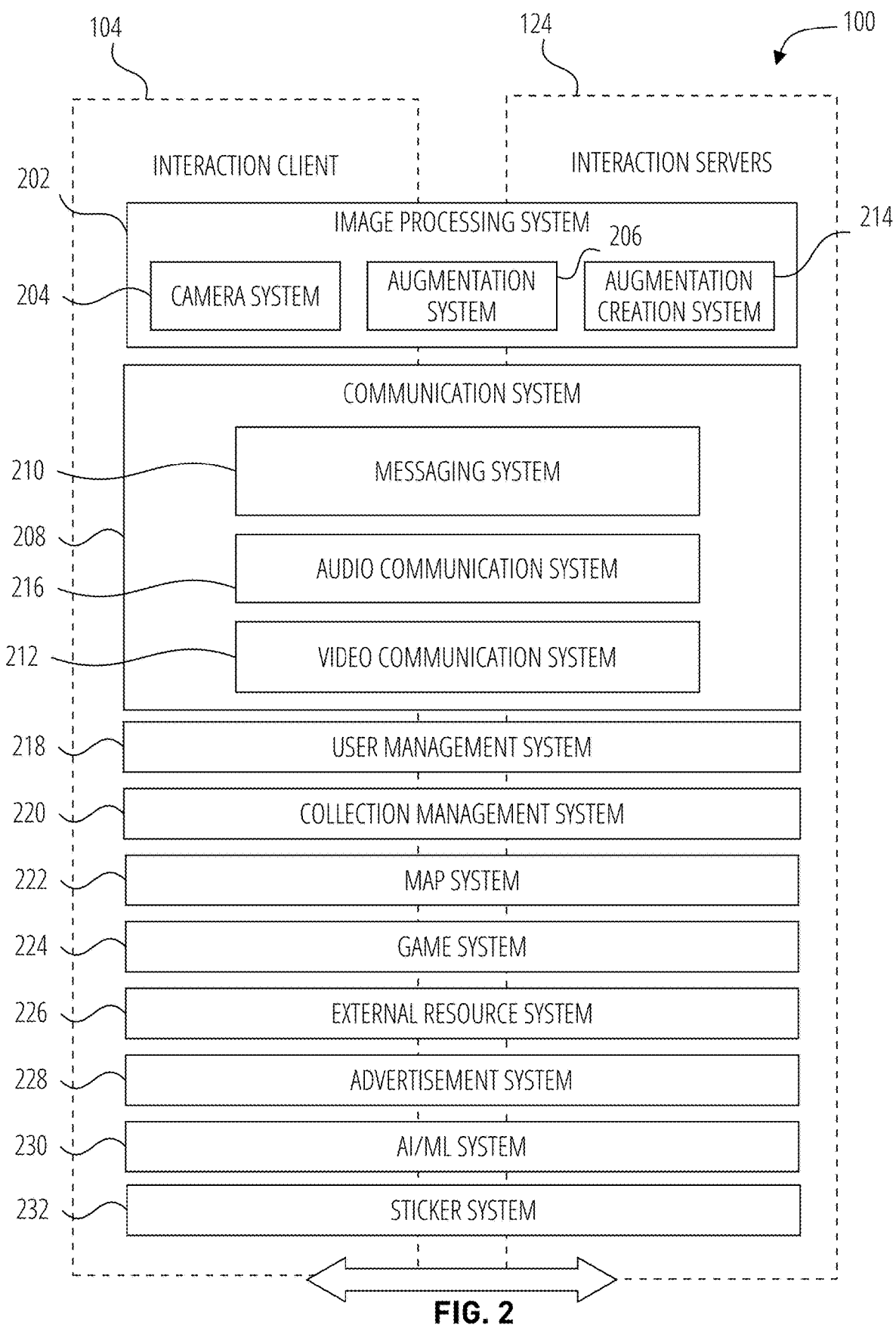
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture. Example subsystems are discussed below.

An image processing system 202 provides various functions that enable a user to capture and augment (e.g., annotate, or otherwise modify or edit) media content associated with a message. A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., filters or media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1002 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, stickers, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates. In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

Referring to "stories" generally, a story is a specific type of message that is usually a collection of images or videos divided into several short sequences. A story may be accompanied by backgrounds, music, audio, texts, stickers, animations, effects and emojis. In some cases, the aim of posting a story is to tell a narrative (e.g., an everyday experience) or to convey a message. In many instances, once a story has been posted, the story may only be available for viewing by others for a short time (e.g., twenty-four hours). Within the interaction system 100, content creation tools may allow a content creator to add a hashtag or specify a location to provide further context for a story.

A map system 222 provides various geographic location functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate (e.g., apply a visual augmentation to) images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic.

The artificial intelligence and machine learning system 230 may also provide chatbot functionality to message interactions 120 between user systems 102 and between a user system 102 and the interaction server system 110. The artificial intelligence and machine learning system 230 may also provide generative functionality, e.g., allowing a user to generate text, image, or video content based on prompts. The artificial intelligence and machine learning system 230 may work with the audio communication system 216 to provide speech recognition and natural language processing capabilities, allowing users to interact with the interaction system 100 using voice commands.

A sticker system 232 provides various sticker functions within the context of the interaction system 100, e.g., within the messaging system 210. A sticker may be placed or added (e.g., at a user-defined position) within a message. A sticker may accompany other content (e.g., text and/or images) within a message. Alternatively, a sticker may itself correspond to the entirety of the content of a message.

The sticker system 232 may implement a sticker search icon state selection feature that is configured to select or transition to a specific sticker search icon state from among a plurality of sticker search icon states of the interaction client 104. One or more states may be preview states that surface, within a messaging interface, a preview of a sticker as a sticker search icon. In a recent sticker preview state, the preview shown as the sticker search icon is a recently used sticker. In a suggested sticker preview state, the preview shown as the sticker search icon is a suggested/recommended sticker. One or more states may be non-preview states. In a non-preview state, the search icon may be a non-user specific icon, e.g., a gray smiley icon or a generic sticker logo. The sticker system 232 may dynamically select and/or switch between sticker search icon states to facilitate user selection of stickers within the context of the interaction client 104, as described further below.

The sticker system 232 may implement a sticker recommendation, or sticker suggestion, feature that is configured to select, from among the collection of available stickers, one or more suggested stickers for use in a message. For example, when a user is viewing a particular media content item (e.g., a message with media content, a story, etc.) communicated to the user by another user, the interaction client 104 may invoke the sticker suggestion service to generate and present a selection of recommended stickers that may be used in a reply message. As another example, when a user opens a messaging interface (e.g., a chat window), the interaction client 104 may invoke the sticker suggestion service to generate and present one or more suggested stickers as a "conversation starter." The sticker suggestion feature may utilize a pre-trained machine learned model, e.g., implemented by the artificial intelligence and machine learning system 230, which takes as input features various attributes and characteristics, e.g., attributes and characteristics of a message that has been received and viewed by the end user. In addition, the machine learning model may take as input features various attributes and characteristics of a sending user and a receiving user. The machine learning model may be trained to generate relevance scores for stickers, based on input features provided to the model reflecting various attributes and characteristics, and to output suggested stickers based on the relevance scores. In some examples, a rules-based selection algorithm may be used to filter or select relevant stickers.

In some examples, the sticker system 232 is configured to maintain a collection of stickers that are available for messaging with respect to the interaction client 104. Accordingly, with some examples, in addition to maintaining the stickers, the sticker system 232 may have and maintain a taxonomy, or a hierarchy of categories or tags, used to organize the available stickers. For instance, a sticker identifier or ID, uniquely identifying a specific sticker, may be assigned to one or more categories, by virtue of assigning or associated one or more tags with the sticker ID. Accordingly, at least with some examples, the pre-trained machine learning model may be a classifier and may generate a relevance score for each of several categories or tags, such that stickers that are associated with the highest scoring categories or tags can be selected for presenting to a message recipient as recommended reply stickers. By way of example, various stickers may convey a message relating to a holiday—e.g., "Happy Holidays," "Merry Christmas," or "Happy St. Paddy's Day." These stickers may then be associated with or assigned to a tag (e.g., a holiday tag), indicating that the stickers are associated with a holiday. When a user receives a message, the various attributes and characteristics of the message, the sender, and the recipient of the message, are provided as input to the pre-trained machine learning model. If the category or tag for holidays receives a high relevance score as output by the machine learning model, then one or more of the stickers assigned to that category or tag may be selected for presenting to a user as a suggested reply sticker.

Data Architecture

Figure 3:
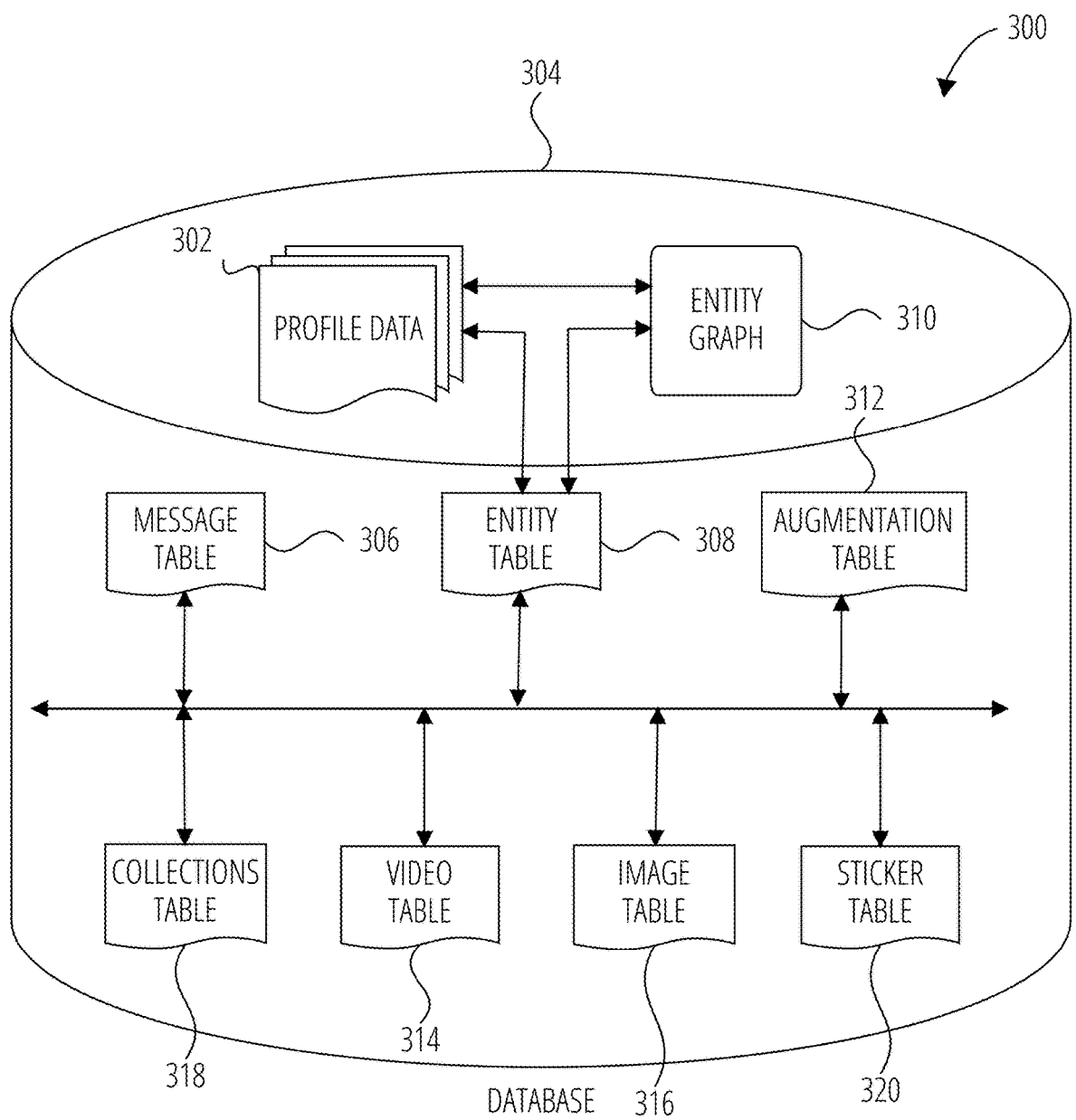
FIG. 3 is a diagrammatic representation of a data structure as maintained in a database, according to some examples.

FIG. 3 is a schematic diagram illustrating data structures 300, which may be stored in a database 304 of the interaction server system 110 (e.g., the database 128 or another database), according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 9.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

A sticker table 320 stores various data relating to digital stickers that may be associated with media content items or messages. By way of example, the sticker table 320 may store for each sticker a unique sticker identifier (ID), which may then be associated with various categories, tags and/or other metadata. For example, the ID may be associated with keywords and with a sticker type, e.g., "avatar category." The sticker table 320 may also store sticker selection history data of a user. For example, the sticker table 320 may store a set of the ten, or twenty, or thirty, most recently used stickers of the user, in chronological order from a usage perspective (or otherwise associate a time of use with each stored entry).

In some examples, the sticker system 232 may be a distributed system, such that the sticker system 232 may reside in part on each user system 102. Accordingly, at least with some examples, a machine learning model may generate the relevance scores for selecting stickers at the user system 102. Similarly, in some examples, a predefined set of stickers are stored locally at the user system 102, e.g., a periodically updated set. For example, a predefined number (e.g., ten, twenty, or thirty) of the most recently used stickers (for a specific user associated with an interaction client 104 running on a user system 102) are stored locally at the user system 102 (e.g., cached on the mobile device 114).

The sticker table 320 may also store sticker suggestion trigger data, e.g., rules governing when to trigger the sticker suggestion service. The sticker table 320 may further store sticker search icon state data, e.g., rules governing how to select a sticker search icon state and/or which icon (e.g., sticker or generic icon) to be surfaced as a search icon within a specific messaging interface.

Figure 4:
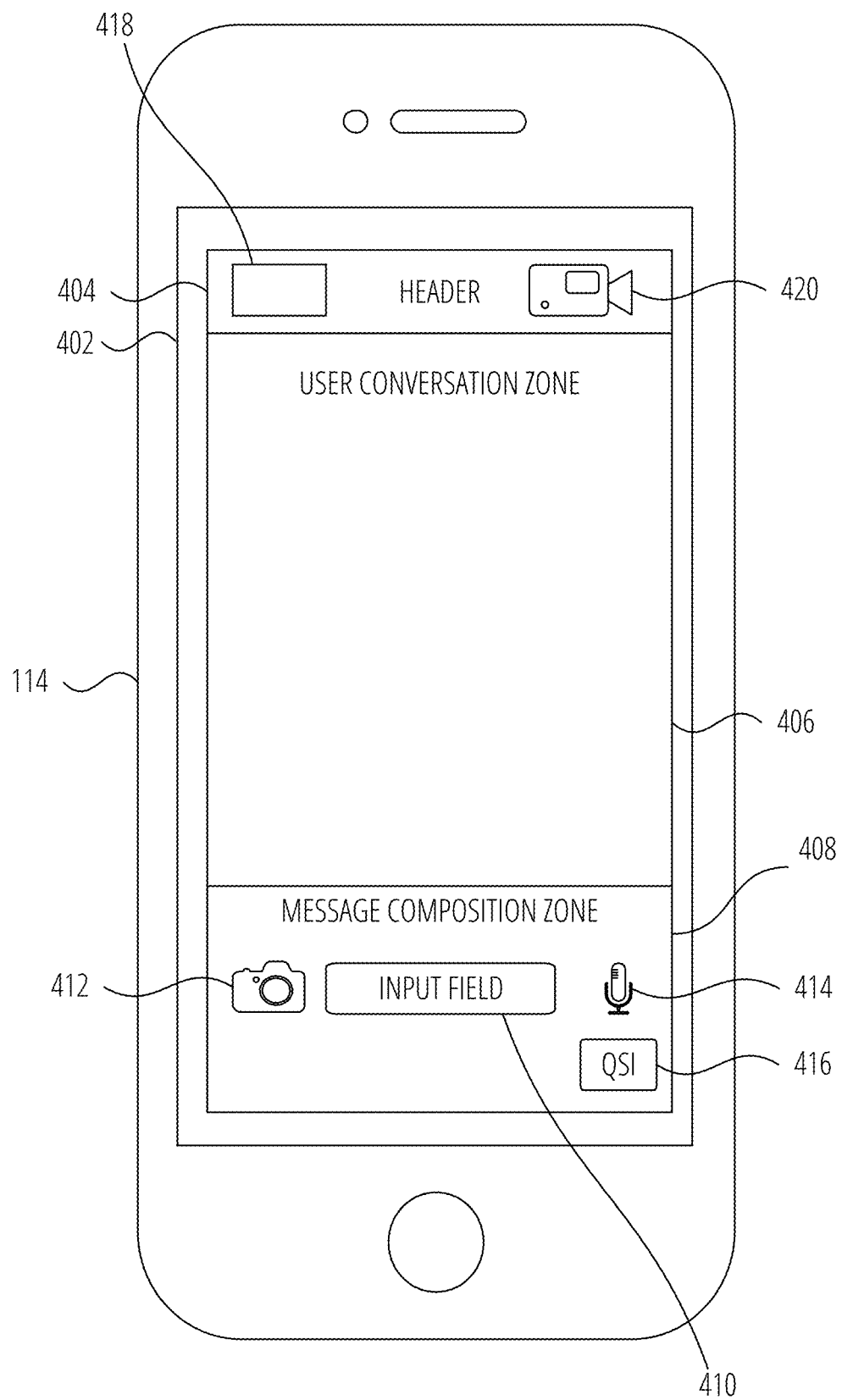
FIG. 4 is a user interface diagram illustrating a messaging interface of an interaction application, wherein the messaging interface includes a sticker search icon, according to some examples.

FIG. 4 is a user interface diagram illustrating a messaging interface 402 of an interaction application, as may be presented on the display of a mobile device 114 (as an example of a user system 102) by the interaction system 100, according to some examples. The messaging interface 402 enables a user to view and interact with messages received from another user, and to compose and send messages to the other user. The active user of the messaging interface 402 as shown in FIG. 4 (and FIGS. 6-8) is referred to below, for ease of reference, as the sending user.

It is noted that while the example interfaces in FIGS. 4 and 6-8 are described and shown as being presented on a touch screen, such as a screen of the mobile device 114, interfaces according to some examples may also be presented using other types of devices that can provide suitable user interfaces or displays, e.g., the optical display of a head-wearable apparatus 116, a desktop computer, or via smart contact lenses. Examples of the present disclosure are thus not restricted to user interfaces that require touch-based gestures.

The messaging interface 402 includes a header 404 that presents a receiving user identifier 418 (e.g., details of the receiving user sending messages to and/or receiving messages from the sending user, or details of a user group in the case of one-to-many messaging), as well as calling options 420, such as an option for the sending user to initiate a voice call or a video call with the receiving user. The messaging interface 402 further includes a user conversation zone 406 that displays a user conversation history, e.g., a history of messages exchanged between the sending user and the receiving user (if any).

A message composition zone 408 is presented below the user conversation zone 406 and enables the sending user to compose a message for transmission to the receiving user via the messaging interface 402 of the interaction client 104. The message composition zone 408 includes an input field 410 that enables the sending user to input text or image data to form part of the message. The message composition zone 408 further includes a number of tools to facilitate message composition, including a camera button 412 that is user selectable to launch a camera function of the interaction client 104 that enables the sending user to capture or select an image (or video) for inclusion in a message, and a voice message button 414 that is user selectable to launch a voice recording function of the interaction client 104 that enables the sending user to record a voice message for transmission to the receiving user.

The sending user may wish to send a sticker to the receiving user, either as a standalone message or together with other message content (e.g., text). To this end, the message composition zone 408 includes a user-selectable search icon in the example form of a quick search icon 416, or QSI, that is presented together with the input field 410, the camera button 412, and the voice message button 414, within the messaging interface 402. The interaction client 104 may receive user input to select the quick search icon 416, e.g., through a tapping gesture directed at the quick search icon 416 within the messaging interface 402. Responsive to receiving the user input to select the quick search icon 416, the interaction client 104 presents a sticker search graphical element (e.g., a sticker search panel), examples of which are described with reference to FIG. 8.

The sticker search graphical element may present one or more user-selectable stickers for selection by the user, and may be user-navigable to enable the user to browse for stickers that are arranged by sticker category. In some examples, the sticker search graphical element is searchable to enable the user to search for stickers that correspond to specific search queries.

Once the sending user has located a desired sticker, the sending user provides appropriate user input to select the sticker. For example, the sending user may perform a tapping gesture directed at the desired sticker, in response to which the interaction client 104 causes presentation of the desired sticker in the input field 410. The sending user may then select a "send" option, causing the interaction system 100 to transmit a message that includes the desired sticker to a user device of the receiving user (executing the interaction client 104 of the receiving user).

The appearance of the quick search icon 416 is, in some examples, based on a quick search icon state of the interaction client 104 with respect to the specific messaging interface 402. In some cases, the sticker search icon state causes the quick search icon 416 to be presented as a user-specific sticker from among the available stickers of the interaction system 100, while in other cases, the sticker search icon state causes the quick search icon 416 to be presented as a non-user specific icon. These states may be selected and updated dynamically by the interaction system 100, based on context and/or user inputs, as will be described further below.

Figure 5:
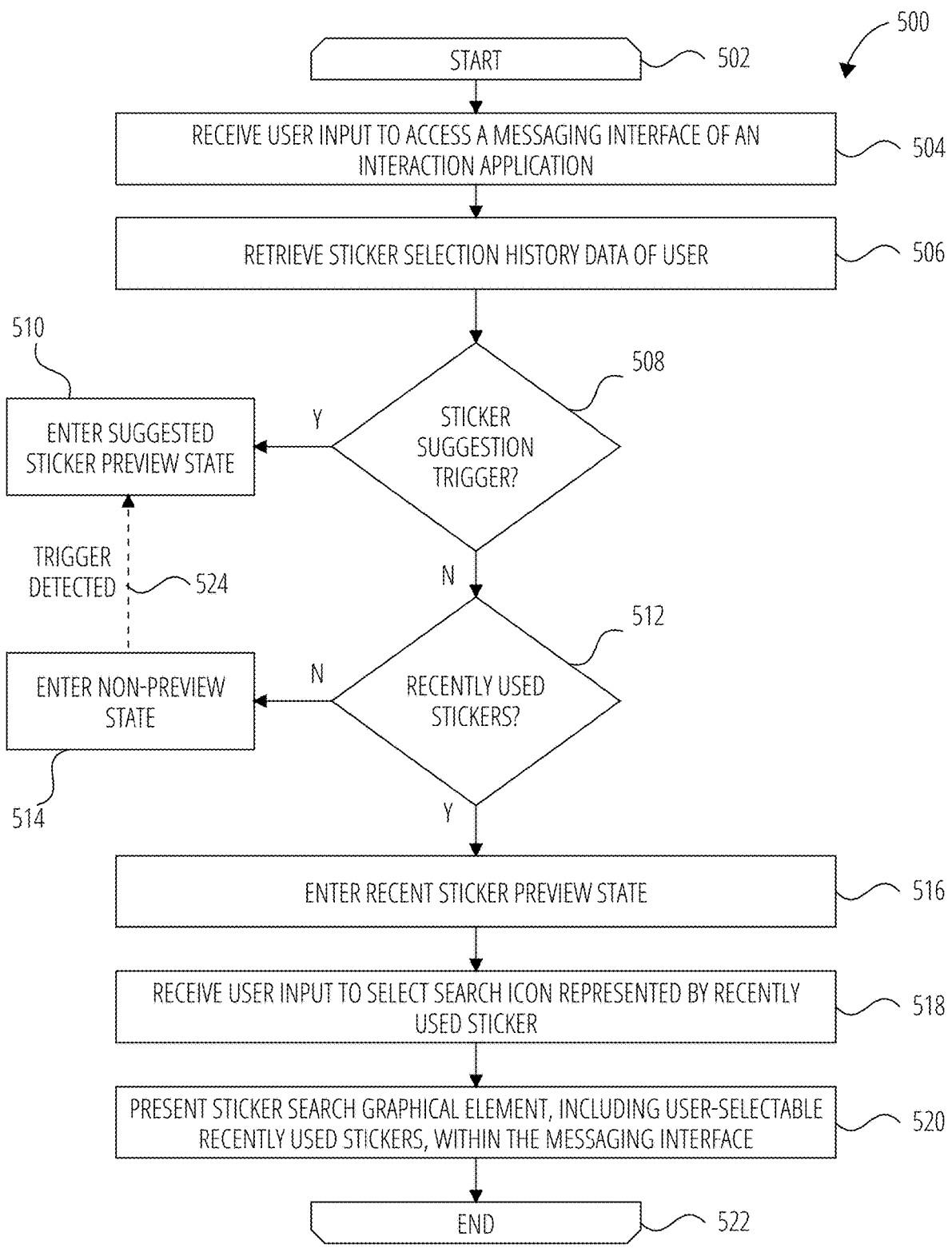
FIG. 5 is a flowchart illustrating a method suitable for facilitating selection of stickers within the context of an interaction system.

FIG. 5 is a flowchart illustrating a method 500 suitable for facilitating selection of stickers within the context of the interaction system 100. The method 500 is performed, in some examples, by various subsystems of the interaction system 100, e.g., the messaging system 210 and/or the sticker system 232. The messaging interface 402 is used as an example user interface to describe certain aspects of the method 500, but it should be appreciated that the method 500 may be performed using various different user interface types, designs, or arrangements.

The method 500 commences at opening loop element 502, and progresses to operation 504, where the interaction client 104 receives user input to access a messaging interface of the interaction client 104. For example, the sending user may access the messaging interface 402 as shown in FIG. 4. Other examples include the sending user making a selection to reply to, or comment on, a media content item shared by another user, or the sending user making a selection to add content to an image or video (e.g., to overlay content onto the image or video before sharing a final version thereof with other users).

The interaction client 104 accesses sticker selection history data of the sending user at operation 506. In the method 500 of FIG. 5, the interaction client 104 checks the sticker selection history data to identify one or more stickers used by the user within a determinable time period. These stickers are typically referred to as recent stickers. For example, the interaction client 104 may identify a most recent set of stickers that the sending user applied in messages within the past fifteen days, or thirty days, or even since creating a user account associated with the interaction system 100. In some cases, and as described further below, the interaction client 104 detects that the sticker selection history data indicates that the sending user has no "recent stickers," e.g., has not used any stickers within the determinable period, or has never used any stickers in the context of the interaction system 100.

At decision operation 508, the interaction client 104 determines whether there is an active sticker suggestion trigger for the particular messaging interface (e.g., for the specific user conversation, or the specific message to be sent by the sending user). In some examples, a sticker suggestion trigger is a condition that causes the sticker suggestion service to generate a suggested sticker for presentation as the quick search icon 416. In other words, where a sticker suggestion trigger is detected, the interaction client 104 may cause a specific "recommended sticker" to be surfaced and presented as the quick search icon 416.

The interaction client 104 may perform one or more automatic checks in order to determine the presence or absence of a sticker suggestion trigger. In the method 500 of FIG. 5, the interaction client 104 checks whether the input field 410 of the messaging interface 402 is empty, and also queries the sticker suggestion service to check whether a suggested sticker has been generated based on context of the user conversation within the messaging interface, or context associated with the sending user and/or the receiving user.

For example, the sending user may have received a message from the receiving user, with the sticker suggestion service generating a recommended reply sticker to be surfaced as the quick search icon 416. In such cases, the message received by the sending user is deemed to be a sticker suggestion trigger. As another example, the sticker suggestion service may generate a "conversation starter" sticker based on previous interactions between the sending user and the receiving user, based on metadata relating to the sending user or the receiving user (e.g., a birthday), or based on other metadata (e.g., a holiday may trigger a holiday-related conversation starting sticker). In such cases, the condition that allows for the generation of the "conversation starter" is deemed to be a sticker suggestion trigger.

The interaction application may communicate a request to the sticker system 232 for one or more suggested stickers. The sticker system 232, after identifying the stickers to recommend, may communicate an indication of the recommended stickers to the user system 102 of the sending user. For instance, with some examples, the indication is a sticker ID for each sticker being recommended. Accordingly, the interaction client 104 may update the presentation of the messaging interface 402 to include a user-selectable sticker for each of the one or more several stickers identified as suggested stickers.

In some examples, where a sticker suggestion trigger is detected, the interaction client 104 enters a first type of preview state, referred to herein as a suggested sticker preview state (operation 510), and presents a suggested sticker for transmission via the messaging interface 402. For example, the suggested sticker may automatically be applied as the quick search icon 416. As mentioned above, the quick search icon 416 is user selectable to launch a function that allows the user to search for and/or select a sticker, e.g., the specific sticker that is presented as the quick search icon 416.

If the interaction client 104 detects the absence of a sticker suggestion trigger (e.g., the input field 410 of the sending user is empty, there is no existing message upon which to base a suggested reply sticker, and there is no "conversation starter" generated for the user conversation), the interaction client 104 does not enter the suggested sticker preview state. At decision operation 512, the interaction client 104 then proceeds to check the sticker selection history data of the sending user. If the sending user has no recent stickers, e.g., there are no stickers stored on the user system 102 in a recent stickers storage location, or the interaction client 104 detects that the sending user has never used the stickers function to include a sticker in a message, the interaction client 104 enters a non-preview state at operation 514.

In the non-preview state of the method 500, the interaction client 104 does not present a preview of an available sticker as the quick search icon 416. Instead, a non-user specific icon, such as a gray logo, or black-and-white logo, is applied. This may be seen as a placeholder icon used in cases where no suggested sticker, or recent sticker, is detected or available for the specific sending user.

If, at decision operation 512, the interaction client 104 detects that the sticker selection history data does include at least one recent sticker, the interaction client 104 enters a second type of preview state, referred to herein as a recent sticker preview state (operation 516). In the recent sticker preview state, the quick search icon 416 is presented so as to correspond with a sticker selected from the one or more "recent stickers" of the sending user, e.g., stickers identified as having been used by the user within a determinable time period.

In some examples, in the recent sticker preview state, the quick search icon 416 is a most recently used sticker of the sending user, as retrieved by the interaction client 104, e.g., from the stored sticker data within the sticker table 320. It may be advantageous to store the sticker data, or at least the recently used sticker data, locally (e.g., cached on the user system 102), thus allowing for surfacing of the appropriate quick search icon 416 immediately (or very shortly after) accessing of the messaging interface 402 by the sending user, obviating the need to load the quick search icon 416 from the interaction server system 110 via the network 108.

The sending user may then select the quick search icon 416 that is represented by the recently used sticker, at operation 518. In response, according to the method 500, the interaction client 104 presents a sticker search graphical element within the messaging interface 402, e.g., a search panel that displays the recently used stickers of the sending user in a user-selectable manner (operation 520). The sending user may then select one or more of the presented stickers for inclusion in a message. The method ends at closing loop element 522.

As mentioned, the sticker search icon state may be dynamically updated by the interaction system 100. For example, where the non-preview state is entered (see operation 514), a generic or placeholder icon may initially be presented as the quick search icon 416. However, the sending user may subsequently perform an action that leads to a condition deemed to be a sticker suggestion trigger. For example, the interaction client 104 may detect user input to populate the input field 410 of the messaging interface 402 with content (e.g., words to be sent to the receiving user). The interaction client 104 then identifies the user input to populate the input field as a sticker suggestion trigger (see the arrow 524 shown in broken lines in FIG. 5), and, responsive to identifying the sticker suggestion trigger, the interaction client 104 may automatically replace the current quick search icon 416 (e.g., the generic or placeholder icon) with a user-specific icon, e.g., a suggested sticker that is based on the content (for example, a suggested sticker deemed most relevant to the text in the input field 410 based on relevance scores generated by the sticker suggestion service).

Figure 6:
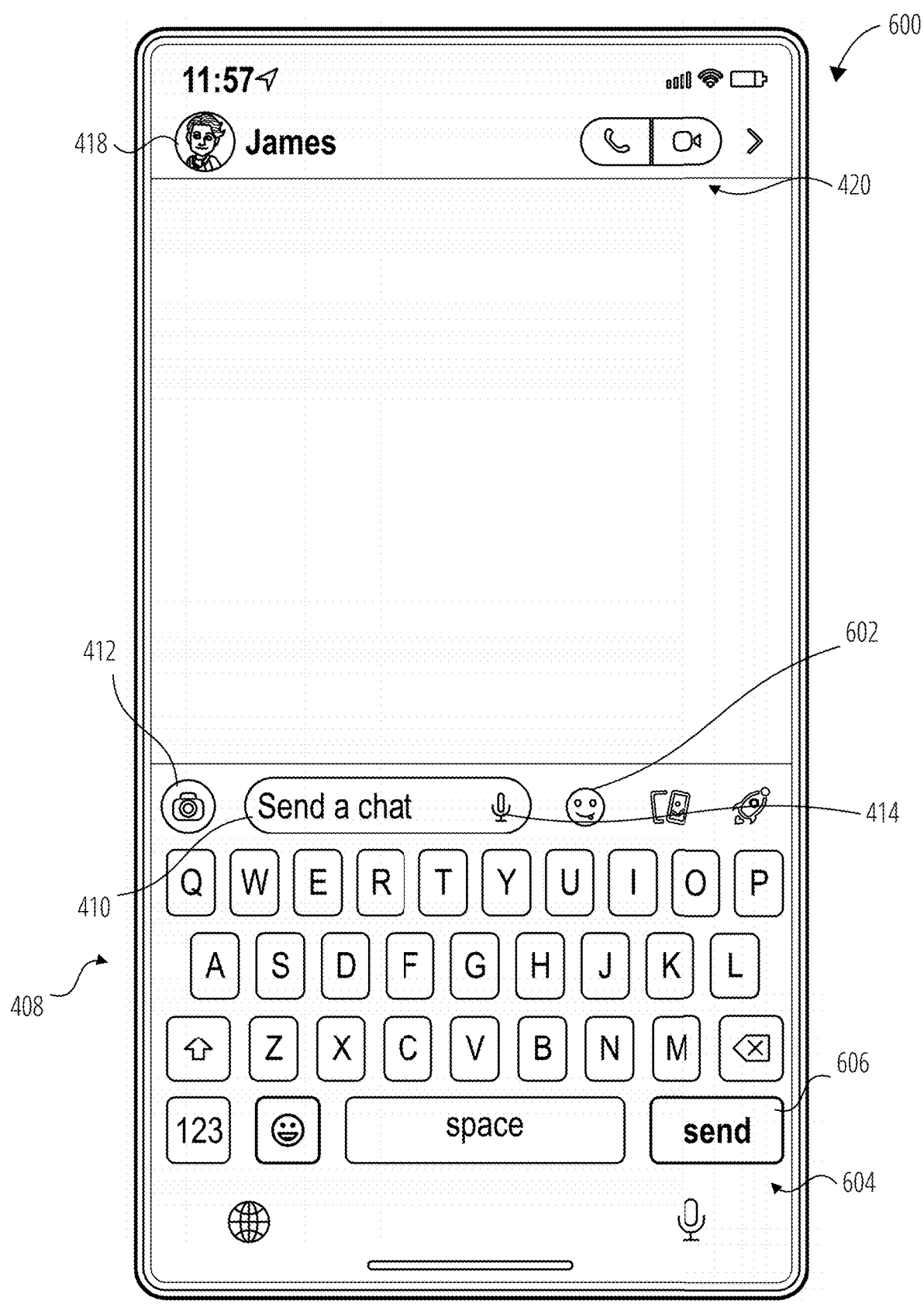
FIG. 6 is a user interface diagram illustrating a messaging interface that includes a sticker search icon corresponding to a non-preview state, according to some examples.

FIG. 6 is a user interface diagram illustrating a messaging interface 600 that includes a sticker search icon, or quick search icon, corresponding to a non-preview state, according to some examples. In the non-preview state of FIG. 6, the sticker search icon is a non-user specific icon 602 in the example form of a generic "smiley face" icon. User selection of the non-user specific icon 602 causes display of a sticker search graphical element, e.g., a search panel or "sticker picker."

In FIG. 6, the non-user specific icon 602 is not one of the available stickers of the interaction system 100, and is a generic icon that represents the stickers class. Accordingly, in the non-preview state of FIG. 6, a sticker (e.g., a recent sticker or a suggested sticker) is not presented at the top user interface level of the messaging interface 600. In other words, the sending user would need to navigate to a lower level (e.g., by selecting the non-user specific icon 602) to view any stickers. FIG. 6 further illustrates a keyboard 604 which may form part of the message composition zone 408, allowing the sending user to compose text content of a message within the input field 410. A send button 606 is user selectable to cause transmission of the final message.

Figure 7:
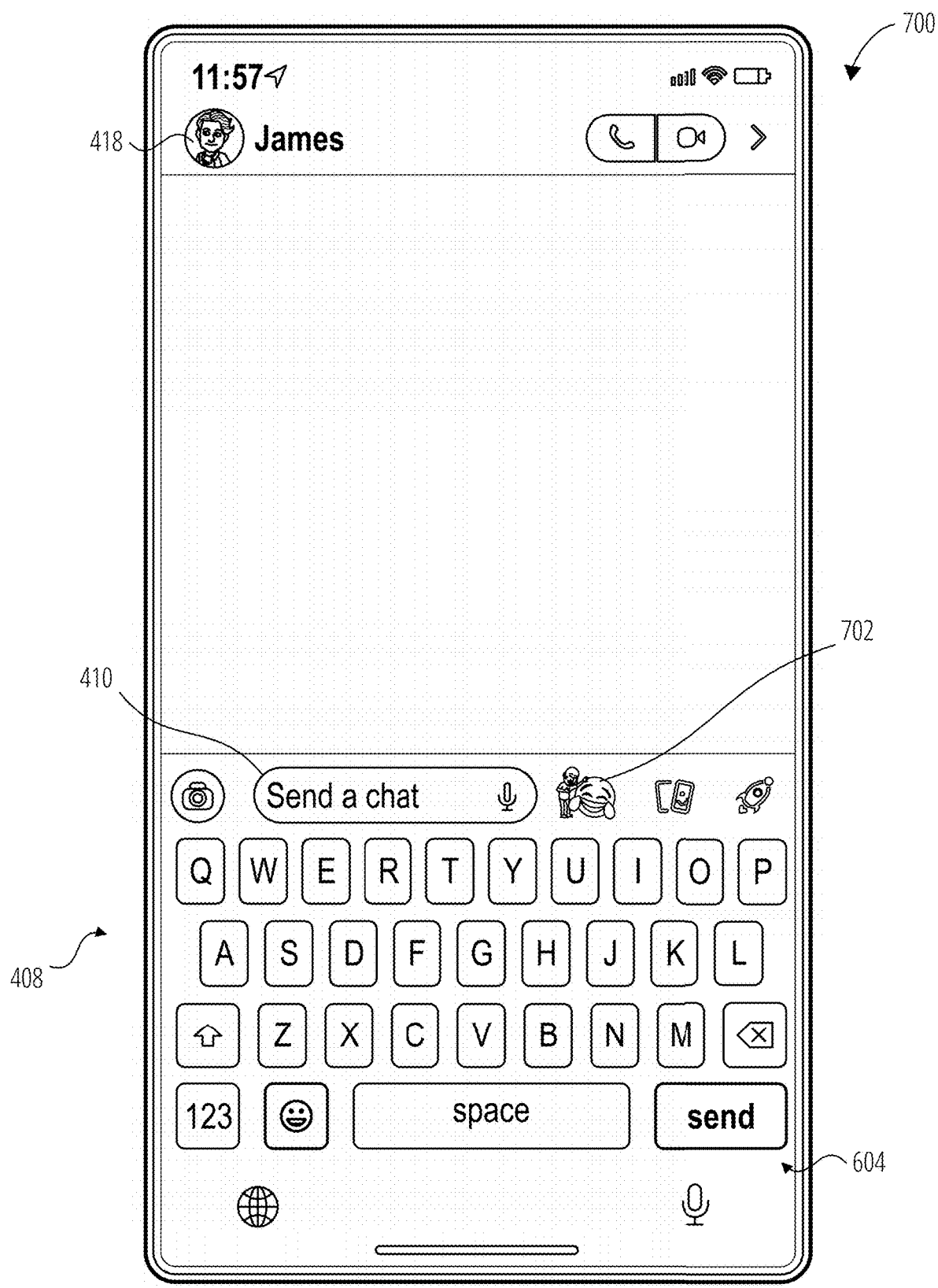
FIG. 7 is a user interface diagram illustrating a messaging interface that includes a sticker search icon corresponding to a preview state, according to some examples.
Figure 8:
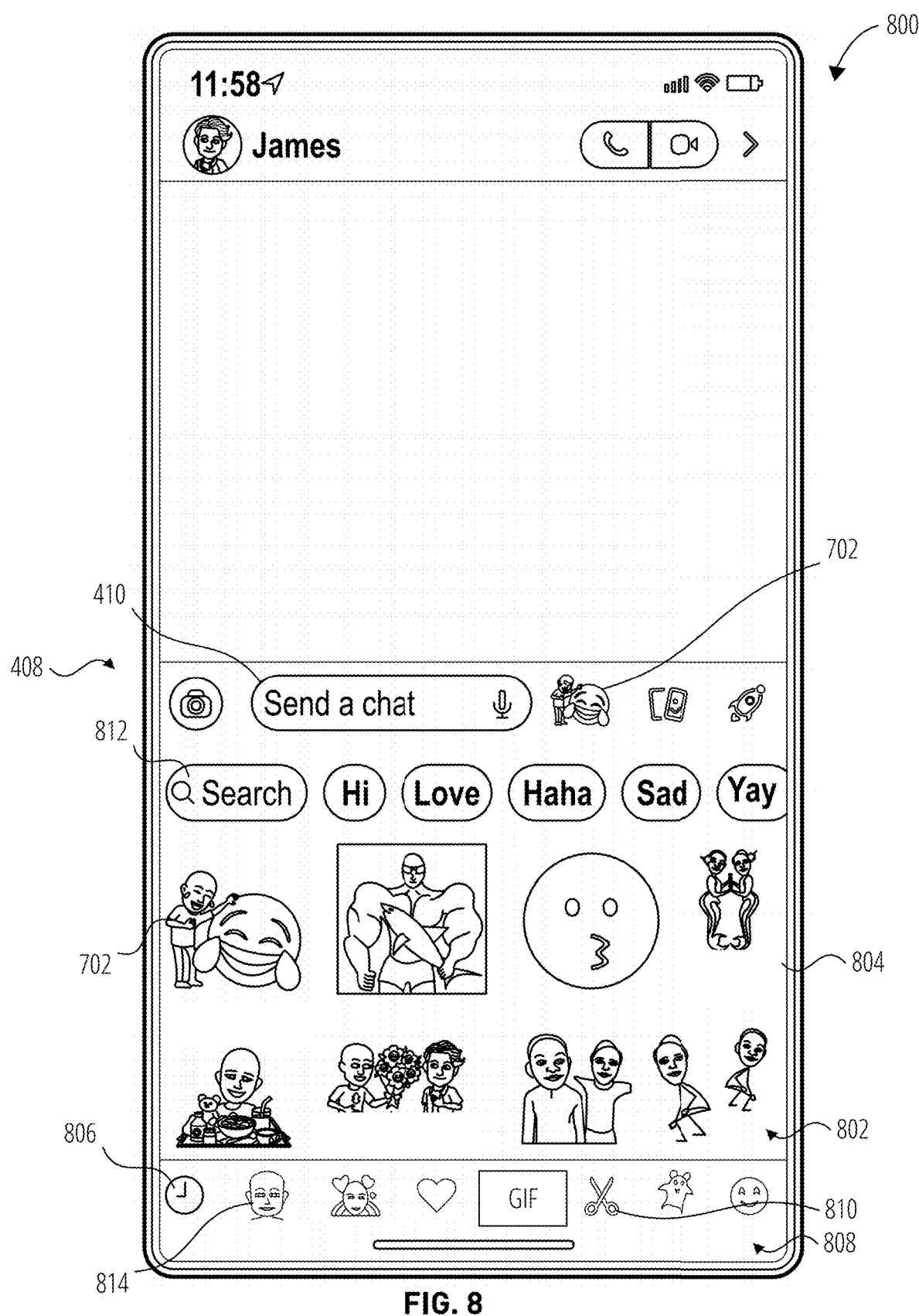
FIG. 8 is a user interface diagram illustrating a messaging interface that includes a sticker search icon corresponding to a preview state and that presents a sticker search graphical element, according to some examples.

FIG. 7 and FIG. 8 illustrate respective example user interfaces before and after the sending user has selected the search icon. Referring firstly to FIG. 7, a user interface diagram illustrating a messaging interface 700 is illustrated. The messaging interface 700 includes a sticker search icon, or quick search icon, corresponding to a preview state, according to some examples. In FIG. 7, the preview state is a recent sticker preview state and, therefore, the sticker search icon is a recent sticker used by the sending user. Specifically, in FIG. 7, the interaction client 104 determines the most recently used sticker 702 associated with the interaction client 104 of the sending user and presents that sticker (in this case, a laughing face icon together with a laughing personalized avatar of the sending user), as the search icon.

The search icon presents the most recently used sticker 702 as a thumbnail of the "actual" sticker (see, for example, the corresponding larger most recently used sticker 702 shown in FIG. 8). The search icon thus serves as a useful preview icon.

In some examples, and as shown in FIG. 7, the interaction system 100 may thus identify a most recently used sticker from one or more stickers used by the user in a determinable time period (e.g., from the twenty or fifty most recent stickers used by the user and cached at the user system 102), and present the most recently used sticker as the search icon within the messaging interface. The most recently used sticker 702 is presented at the top user interface level of the messaging interface 700. In contrast to the generic icon of FIG. 6, the most recently used sticker 702 depicts one of the available stickers of the interaction system 100. However, similarly to FIG. 6, the most recently used sticker 702 represents the stickers class in that it is user selectable to launch a sticker search or sticker selection function.

User selection of the most recently used sticker 702 causes display of a sticker search graphical element, as shown in FIG. 8. In FIG. 8, a messaging interface 800 is shown as presented in response user selection of the most recently used sticker 702 of FIG. 7, according to some examples.

Referring specifically to FIG. 8, the interaction client 104 automatically enlarges the message composition zone 408 by expanding it upwards (reducing the size of the user conversation zone 406 to accommodate the larger message composition zone 408). The message composition zone 408 is updated to include a sticker search graphical element in the example form of a search panel 804, which in turn includes a plurality of graphical elements and icons, including a set of recently used stickers 802 of the sending user. The stickers identified in the sticker selection history data correspond to the user-selectable recently used stickers 802 presented within the messaging interface 800.

The recently used stickers 802 are arranged chronologically, with the most recently used sticker 702 being presented in a first position (top left) within the user-navigable search panel 804 of the message composition zone 408. The search panel 804 may also be referred to as a "sticker picker" section of the messaging interface 800. Of course, in various alternative examples, different presentation formats are possible. The user may select any one or more of the stickers presented within the messaging interface 800.

As mentioned, various sticker types or sticker categories may be supported within the interaction system 100. Within the search panel 804, stickers are arranged according to various sticker categories 808. A recents category 806, or recents tab, is pre-selected based on the current state (the recent sticker preview state). The user may navigate to other sticker categories 808, e.g., to a user-created stickers category 810 or an avatars category 814, by selecting the relevant tab at the bottom of the messaging interface 800. These tabs form part of the search panel 804.

In some examples, the user may navigate (e.g., swipe or scroll) through each (or one or more) category to view further stickers that are not initially in view within the search panel 804. For example, the user may scroll to the right to view further recent stickers included in the set of recently used stickers 802 retrieved by the interaction client 104. The search panel 804 also includes a search query section 812 that allows the user to search for desired stickers. The user can type a search query into the search query section 812 and the interaction client 104 may utilize metadata linked to each sticker (e.g., tags or keywords) to retrieve search results based on the search query. In some examples, the interaction client 104 may execute a local search engine (e.g., using sticker data from the sticker table 320 that is locally stored at the user system 102) in order to surface search results quickly, without the need to transmit the query to a server-side component.

In some examples, once the user starts typing a query within the search query section 812, the interaction client 104 may transition to a different sticker search icon state in the example form of a search preview state. In the search preview state, the most relevant sticker result, based on the current query in the search query section 812, is presented as the search icon and/or the recently used stickers 802 may be replaced by a set of search result stickers. For example, in FIG. 8, the user may start typing and enter the word "love," in response to which the most recently used sticker 702 may be replaced as the search icon by the most relevant search result, e.g., a sticker that depicts a heart shape, and/or the recently used stickers 802 may be replaced by stickers that are associated with the text "love."

Still referring to FIG. 8, and consistent with some examples, upon selecting a sticker from the messaging interface 800, the sticker will automatically populate the input field 410 and be ready for sending (e.g., by selecting a send button). In this way, the sending user can select a sticker, e.g., a recently used sticker that is automatically surfaced as a first category based on the sticker search icon state, and send it to a receiving user (e.g., with some additional text or other content). However, in some alternative examples, upon selecting a sticker from the messaging interface 800, the sticker will automatically be sent as a reply message, without any additional text and without requiring selection of a send button or further user action.

Data Communications Architecture

Figure 9:
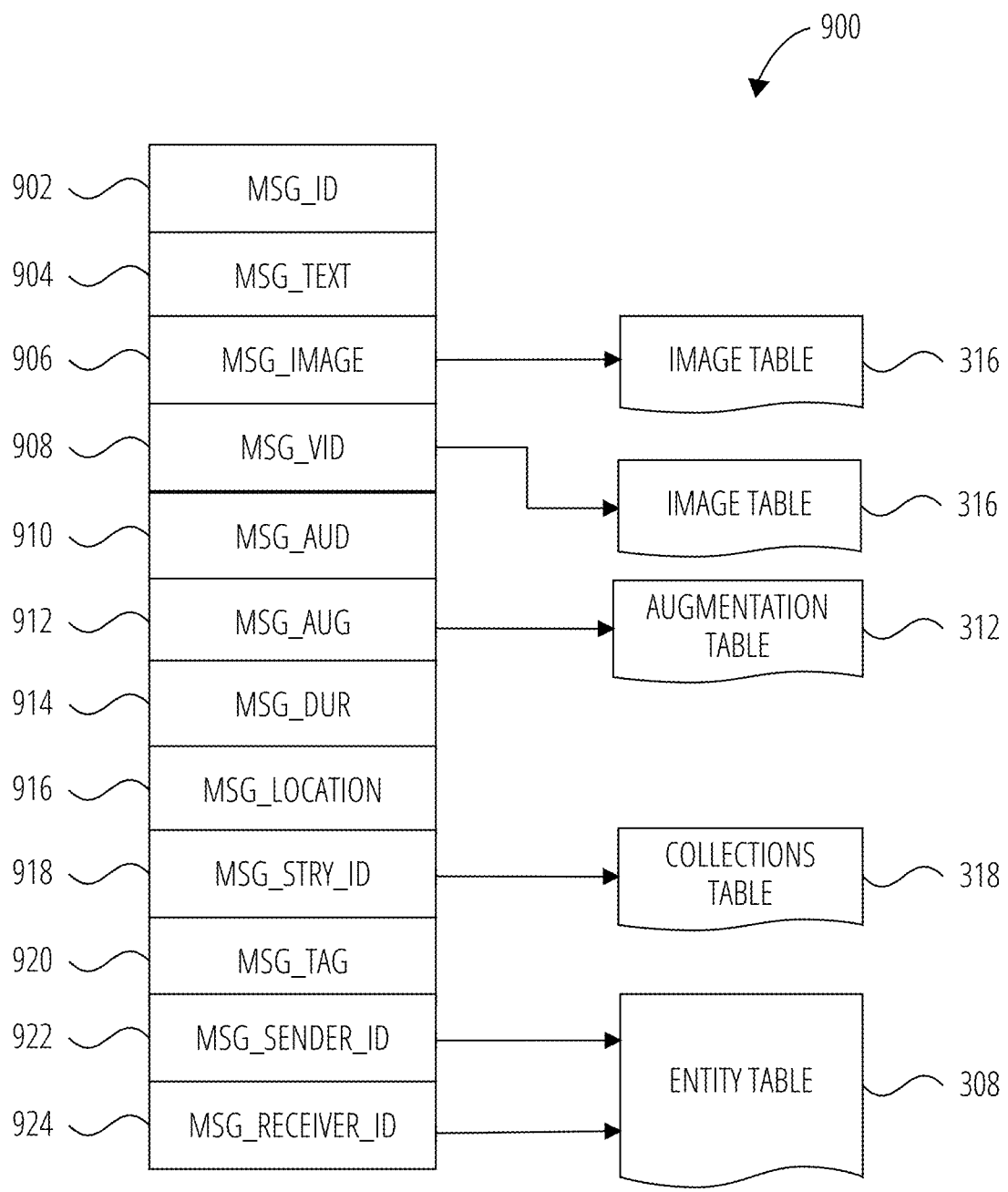
FIG. 9 is a diagrammatic representation of a message, according to some examples.

FIG. 9 is a schematic diagram illustrating a structure of a message 900, according to some examples, generated by an interaction client 104 for communication to a further interaction client 104 via the interaction servers 124. The content of a particular message 900 is used to populate the message table 306 stored within the database 304, accessible by the interaction servers 124. Similarly, the content of a message 900 is stored in memory as "in-transit" or "in-flight" data of the user system 102 or the interaction servers 124. A message 900 is shown to include the following example components:

Message identifier 902: a unique identifier that identifies the message 900.

Message text payload 904: text, to be generated by a user via a user interface of the user system 102, and that is included in the message 900.

Message image payload 906: image data, captured by a camera component of a user system 102 or retrieved from a memory component of a user system 102, and that is included in the message 900. Image data for a sent or received message 900 may be stored in the image table 316. Image data may include stickers from the sticker table 320.

Message video payload 908: video data, captured by a camera component or retrieved from a memory component of the user system 102, and that is included in the message 900. Video data for a sent or received message 900 may be stored in the image table 316.

Message audio payload 910: audio data, captured by a microphone or retrieved from a memory component of the user system 102, and that is included in the message 900.

Message augmentation data 912: augmentation data (e.g., filters, stickers, or other annotations or enhancements) that represents augmentations to be applied to message image payload 906, message video payload 908, or message audio payload 910 of the message 900. Augmentation data for a sent or received message 900 may be stored in the augmentation table 312.

Message duration parameter 914: parameter value indicating, in seconds, the amount of time for which content of the message (e.g., the message image payload 906, message video payload 908, message audio payload 910) is to be presented or made accessible to a user via the interaction client 104.

Message geolocation parameter 916: geolocation data (e.g., latitudinal and longitudinal coordinates) associated with the content payload of the message. Multiple message geolocation parameter 916 values may be included in the payload, each of these parameter values being associated with respect to content items included in the content (e.g., a specific image within the message image payload 906, or a specific video in the message video payload 908).

Message story identifier 918: identifier values identifying one or more content collections (e.g., "stories" identified in the collections table 318) with which a particular content item in the message image payload 906 of the message 900 is associated. For example, multiple images within the message image payload 906 may each be associated with multiple content collections using identifier values.

Message tag 920: each message 900 may be tagged with multiple tags, each of which is indicative of the subject matter of content included in the message payload. For example, where a particular image included in the message image payload 906 depicts an animal (e.g., a lion), a tag value may be included within the message tag 920 that is indicative of the relevant animal. Tag values may be generated manually, based on user input, or may be automatically generated using, for example, image recognition.

Message sender identifier 922: an identifier (e.g., a messaging system identifier, email address, or device identifier) indicative of a user of the user system 102 on which the message 900 was generated and from which the message 900 was sent.

Message receiver identifier 924: an identifier (e.g., a messaging system identifier, email address, or device identifier) indicative of a user of the user system 102 to which the message 900 is addressed.

The contents (e.g., values) of the various components of message 900 may be pointers to locations in tables within which content data values are stored. For example, an image value in the message image payload 906 may be a pointer to (or address of) a location within an image table 316. Similarly, values within the message video payload 908 may point to data stored within an image table 316, values stored within the message augmentation data 912 may point to data stored in an augmentation table 312, values stored within the message story identifier 918 may point to data stored in a collections table 318, and values stored within the message sender identifier 922 and the message receiver identifier 924 may point to user records stored within an entity table 308.

System with Head-Wearable Apparatus

Figure 10:
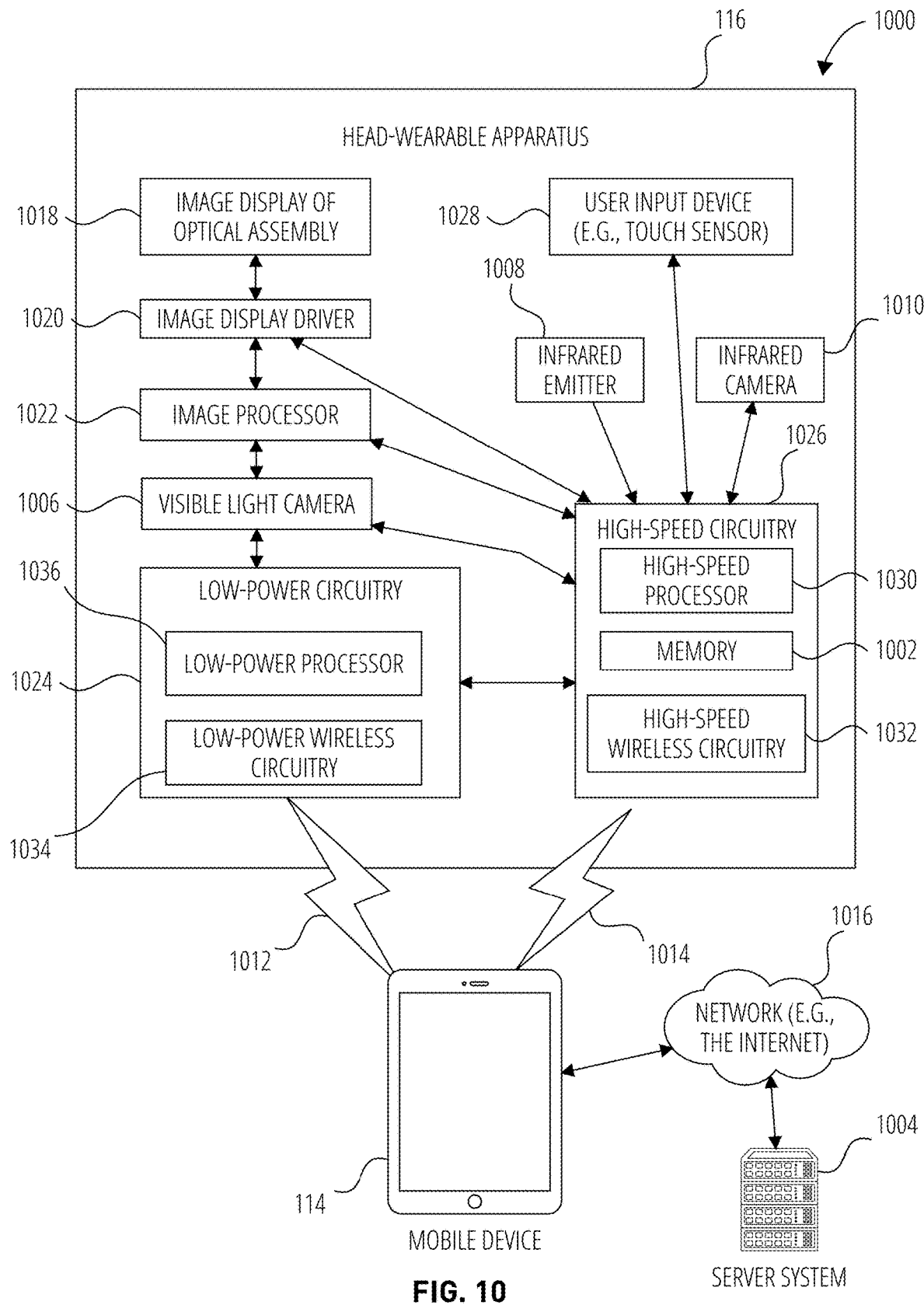
FIG. 10 illustrates a system including a head-wearable apparatus, according to some examples.

FIG. 10 illustrates a system 1000 including a head-wearable apparatus 116, according to some examples. FIG. 10 is a high-level functional block diagram of an example head-wearable apparatus 116 communicatively coupled to a mobile device 114 and various server systems 1004 (e.g., the interaction server system 110) via various networks 108.

The head-wearable apparatus 116 includes one or more cameras, each of which may be, for example, a visible light camera 1006, an infrared emitter 1008, and an infrared camera 1010.

The mobile device 114 connects with head-wearable apparatus 116 using both a low-power wireless connection 1012 and a high-speed wireless connection 1014. The mobile device 114 is also connected to the server system 1004 and the network 1016.

The head-wearable apparatus 116 further includes two image displays of the image display of optical assembly 1018. The two image displays of optical assembly 1018 include one associated with the left lateral side and one associated with the right lateral side of the head-wearable apparatus 116. The head-wearable apparatus 116 also includes an image display driver 1020, an image processor 1022, low-power circuitry 1024, and high-speed circuitry 1026. The image display of optical assembly 1018 is for presenting images and videos, including an image that can include a graphical user interface to a user of the head-wearable apparatus 116.

The image display driver 1020 commands and controls the image display of optical assembly 1018. The image display driver 1020 may deliver image data directly to the image display of optical assembly 1018 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1028 (e.g., touch sensor or push button), including an input surface on the head-wearable apparatus 116. The user input device 1028 (e.g., touch sensor or push button) is to receive from the user an input selection to manipulate the graphical user interface of the presented image.

The components shown in FIG. 10 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1006 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1002, which stores instructions to perform a subset or all of the functions described herein. The memory 1002 can also include a storage device.

As shown in FIG. 10, the high-speed circuitry 1026 includes a high-speed processor 1030, a memory 1002, and high-speed wireless circuitry 1032. In some examples, the image display driver 1020 is coupled to the high-speed circuitry 1026 and operated by the high-speed processor 1030 in order to drive the left and right image displays of the image display of optical assembly 1018. The high-speed processor 1030 may be any processor capable of managing high-speed communications and operation of any general computing system needed for the head-wearable apparatus 116. The high-speed processor 1030 includes processing resources needed for managing high-speed data transfers on a high-speed wireless connection 1014 to a wireless local area network (WLAN) using the high-speed wireless circuitry 1032. In certain examples, the high-speed processor 1030 executes an operating system such as a LINUX operating system or other such operating system of the head-wearable apparatus 116, and the operating system is stored in the memory 1002 for execution. In addition to any other responsibilities, the high-speed processor 1030 executing a software architecture for the head-wearable apparatus 116 is used to manage data transfers with high-speed wireless circuitry 1032. In certain examples, the high-speed wireless circuitry 1032 is configured to implement Institute of Electrical and Electronic Engineers (IEEE) 802.11 communication standards, also referred to herein as Wi-Fi®. In some examples, other high-speed communications standards may be implemented by the high-speed wireless circuitry 1032.

The low-power wireless circuitry 1034 and the high-speed wireless circuitry 1032 of the head-wearable apparatus 116 can include short-range transceivers (Bluetooth™) and wireless wide, local, or wide area network transceivers (e.g., cellular or Wi-Fi®). Mobile device 114, including the transceivers communicating via the low-power wireless connection 1012 and the high-speed wireless connection 1014, may be implemented using details of the architecture of the head-wearable apparatus 116, as can other elements of the network 1016.

The memory 1002 includes any storage device capable of storing various data and applications, including, among other things, camera data generated by the left and right visible light cameras 1006, the infrared camera 1010, and the image processor 1022, as well as images generated for display by the image display driver 1020 on the image displays of the image display of optical assembly 1018. While the memory 1002 is shown as integrated with high-speed circuitry 1026, in some examples, the memory 1002 may be an independent standalone element of the head-wearable apparatus 116. In certain such examples, electrical routing lines may provide a connection through a chip that includes the high-speed processor 1030 from the image processor 1022 or the low-power processor 1036 to the memory 1002. In some examples, the high-speed processor 1030 may manage addressing of the memory 1002 such that the low-power processor 1036 will boot the high-speed processor 1030 any time that a read or write operation involving memory 1002 is needed.

As shown in FIG. 10, the low-power processor 1036 or high-speed processor 1030 of the head-wearable apparatus 116 can be coupled to the camera (visible light camera 1006, infrared emitter 1008, or infrared camera 1010), the image display driver 1020, the user input device 1028 (e.g., touch sensor or push button), and the memory 1002.

The head-wearable apparatus 116 is connected to a host computer. For example, the head-wearable apparatus 116 is paired with the mobile device 114 via the high-speed wireless connection 1014 or connected to the server system 1004 via the network 1016. The server system 1004 may be one or more computing devices as part of a service or network computing system, for example, that includes a processor, a memory, and network communication interface to communicate over the network 1016 with the mobile device 114 and the head-wearable apparatus 116.

The mobile device 114 includes a processor and a network communication interface coupled to the processor. The network communication interface allows for communication over the network 1016, low-power wireless connection 1012, or high-speed wireless connection 1014. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1020. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1004, such as the user input device 1028, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:

Electroencephalography (EEG) based BMIs, which record electrical activity in the brain using electrodes placed on the scalp.

Invasive BMIs, which use electrodes that are surgically implanted into the brain.

Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1012 and high-speed wireless connection 1014 from the mobile device 114 via the low-power wireless circuitry 1034 or high-speed wireless circuitry 1032.

Figure 11:
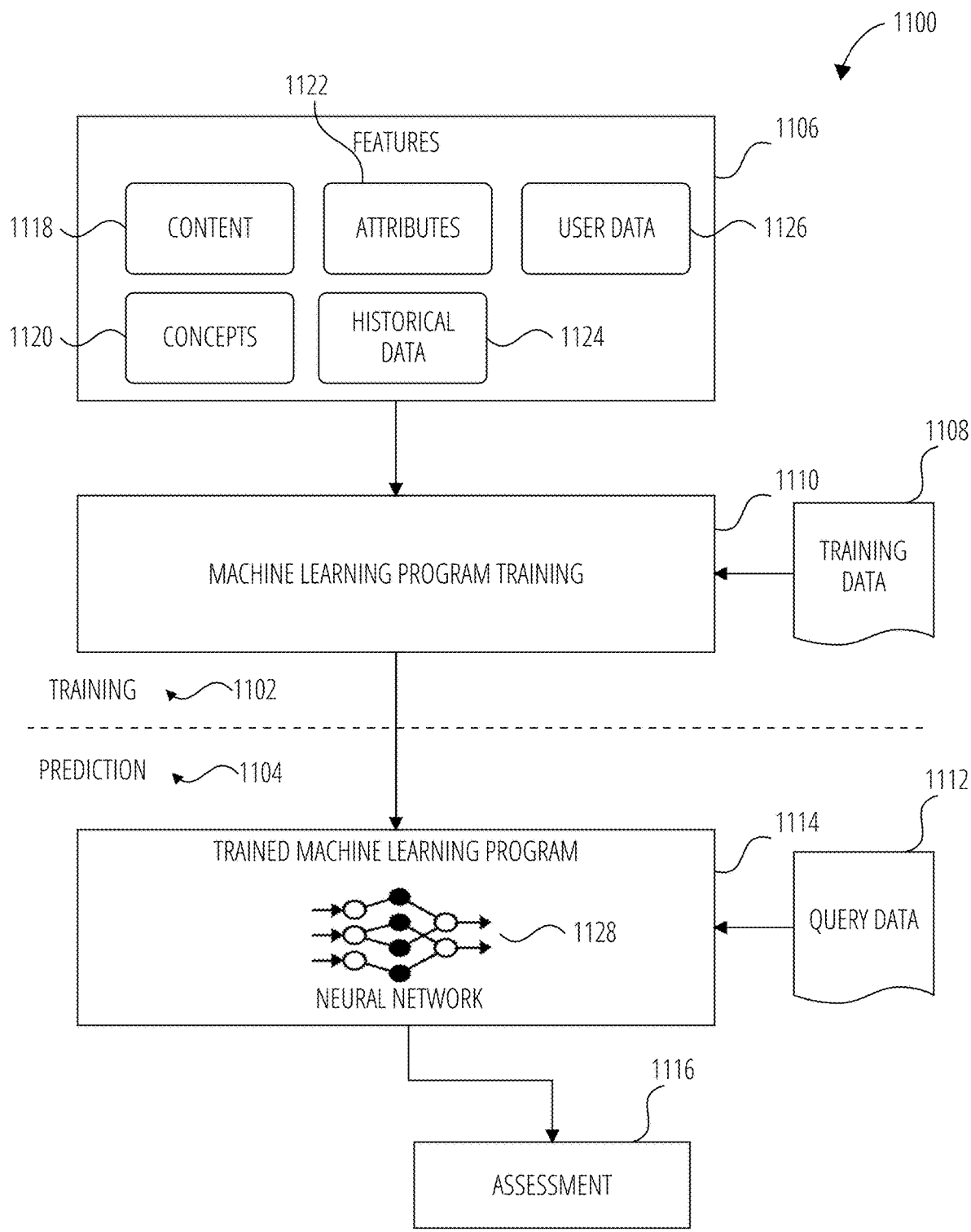
FIG. 11 is a diagram illustrating training and use of a machine learning program, according to some examples.

FIG. 11 is a block diagram generally illustrating a machine learning program 1100, according to some examples. Machine learning programs, also referred to as machine learning algorithms or tools, may be used as part of the techniques and systems described herein.

Machine learning explores the study and construction of algorithms, also referred to herein as tools, that may learn from or be trained using existing data and make predictions about or based on new data. Such machine learning tools operate by building a model from training data 1108 in order to make data-driven predictions or decisions expressed as outputs or assessments (e.g., assessment 1116). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used. Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1100 supports two types of phases, namely training phases 1102 and prediction phases 1104. In training phases 1102, supervised learning, unsupervised or reinforcement learning may be used. For example, the machine learning program 1100 (1) receives features 1106 (e.g., as structured or labeled data in supervised learning) and/or (2) identifies features 1106 (e.g., unstructured or unlabeled data for unsupervised learning) in training data 1108. In prediction phases 1104, the machine learning program 1100 uses the features 1106 for analyzing query data 1112 to generate outcomes or predictions, as examples of an assessment 1116 (this phase is also referred to as inference).

In a training phase 1102, feature engineering may be used to identify features 1106 and may include identifying informative, discriminating, and independent features for the effective operation of the machine learning program 1100 in pattern recognition, classification, and regression. In some examples, the training data 1108 includes labeled data, which is known data for pre-identified features 1106 and one or more outcomes. Each of the features 1106 may be a variable or attribute, such as individual measurable property of a process, article, system, or phenomenon represented by a data set (e.g., the training data 1108). Features 1106 may also be of different types, such as numeric features, strings, and graphs, and may include one or more of content 1118, concepts 1120, attributes 1122, historical data 1124 and/or user data 1126, merely for example.

The concept of a feature in this context is related to that of an explanatory variable used in statistical techniques such as linear regression. Choosing informative, discriminating, and independent features is important for the effective operation of the machine learning program 1100 in pattern recognition, classification, and regression. Features may be of different types, such as numeric features, strings, and graphs.

In training phases 1102, the machine learning program 1100 uses the training data 1108 to find correlations among the features 1106 that affect a predicted outcome or assessment 1116. With the training data 1108 and the identified features 1106, the machine learning program 1100 is trained during the training phase 1102 at machine learning program training 1110. The machine learning program 1100 appraises values of the features 1106 as they correlate to the training data 1108. The result of the training is the trained machine learning program 1114 (e.g., a trained or learned model).

Further, the training phases 1102 may involve machine learning, in which the training data 1108 is structured (e.g., labeled during preprocessing operations), and the trained machine learning program 1114 implements a relatively simple neural network 1128 capable of performing, for example, classification and clustering operations. In other examples, the training phase 1102 may involve deep learning, in which the training data 1108 is unstructured, and the trained machine learning program 1114 implements a deep neural network 1128 that is able to perform both feature extraction and classification/clustering operations.

A neural network 1128 generated during the training phase 1102, and implemented within the trained machine learning program 1114, may include a hierarchical (e.g., layered) organization of neurons. For example, neurons (or nodes) may be arranged hierarchically into a number of layers, including an input layer, an output layer, and multiple hidden layers. Each of the layers within the neural network 1128 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1128 may also be one of a number of different types of neural networks, including a single-layer feed-forward network, an Artificial Neural Network (ANN), a Recurrent Neural Network (RNN), a transformer network, a symmetrically connected neural network, an unsupervised pre-trained network, a Convolutional Neural Network (CNN), or a Recursive Neural Network (RNN), merely for example.

During prediction phases 1104, or inference, the trained machine learning program 1114 is used to perform an assessment. Query data 1112 is provided as an input to the trained machine learning program 1114, and the trained machine learning program 1114 generates the assessment 1116 as output, responsive to receipt of the query data 1112.

Machine Architecture

Figure 12:
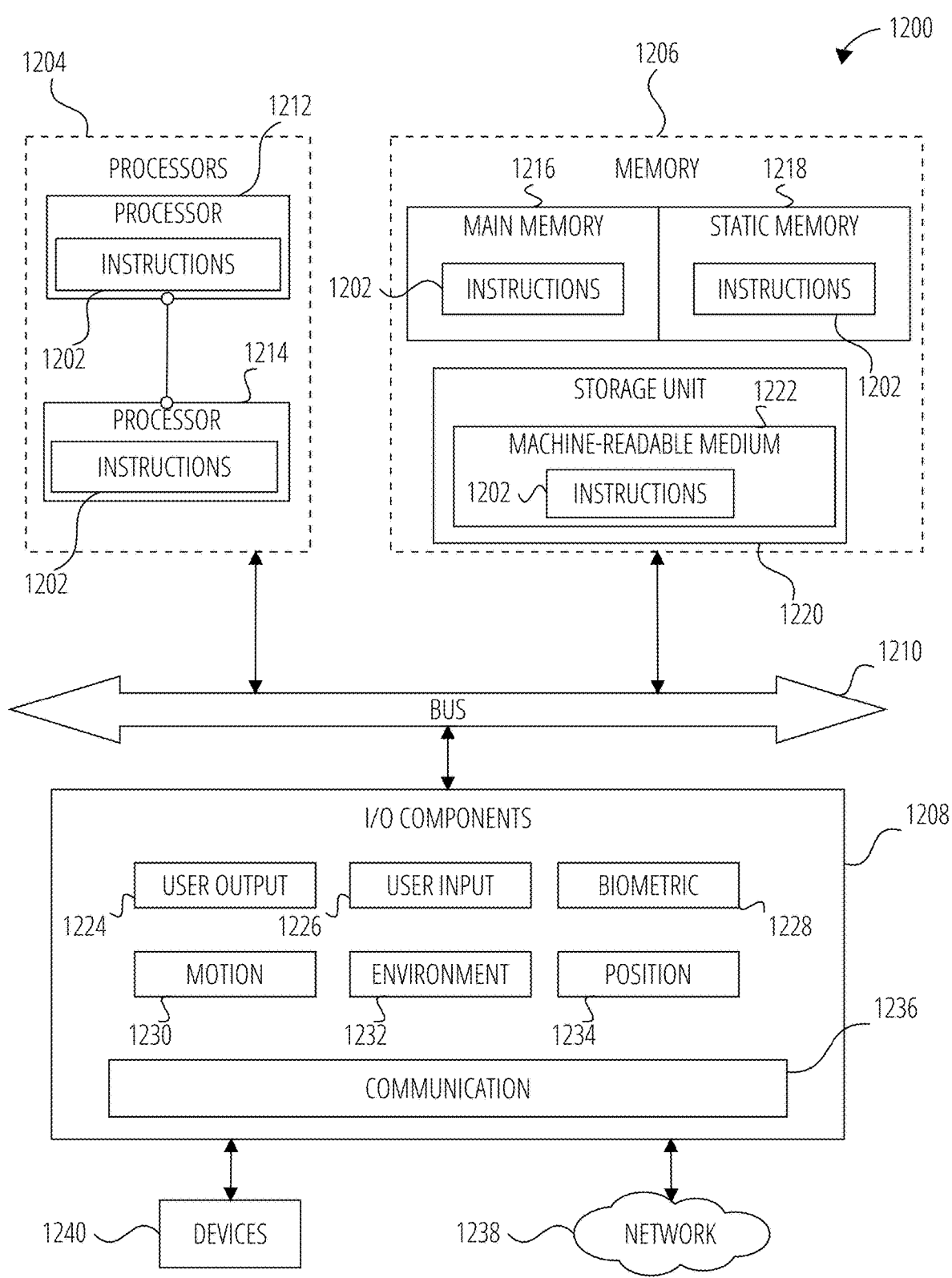
FIG. 12 is a diagrammatic representation of a machine in the form of a computer system within which a set of instructions may be executed to cause the machine to perform any one or more of the methodologies discussed herein, according to some examples.

FIG. 12 is a diagrammatic representation of the machine 1200 within which instructions 1202 (e.g., software, a program, an application, an applet, an app, or other executable code) for causing the machine 1200 to perform any one or more of the methodologies discussed herein may be executed. For example, the instructions 1202 may cause the machine 1200 to execute any one or more of the methods described herein. The instructions 1202 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1202, sequentially or otherwise, that specify actions to be taken by the machine 1200. Further, while a single machine 1200 is illustrated, the term "machine" shall also be taken to include a collection of machines that individually or jointly execute the instructions 1202 to perform any one or more of the methodologies discussed herein. The machine 1200, for example, may comprise the user system 102 or any one of multiple server devices forming part of the interaction server system 110. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1208, which may be configured to communicate with each other via a bus 1210. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1212 and a processor 1214 that execute the instructions 1202. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1216, a static memory 1218, and a storage unit 1220, both accessible to the processors 1204 via the bus 1210. The main memory 1206, the static memory 1218, and storage unit 1220 store the instructions 1202 embodying any one or more of the methodologies or functions described herein. The instructions 1202 may also reside, completely or partially, within the main memory 1216, within the static memory 1218, within machine-readable medium 1222 within the storage unit 1220, within at least one of the processors 1204 (e.g., within the processor's cache memory), or any suitable combination thereof, during execution thereof by the machine 1200.

The I/O components 1208 may include a wide variety of components to receive input, provide output, produce output, transmit information, exchange information, capture measurements, and so on. The specific I/O components 1208 that are included in a particular machine will depend on the type of machine. For example, portable machines such as mobile phones may include a touch input device or other such input mechanisms, while a headless server machine will likely not include such a touch input device. It will be appreciated that the I/O components 1208 may include many other components that are not shown in FIG. 12. In various examples, the I/O components 1208 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1208 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1230 include acceleration sensor components (e.g., accelerometer), gravitation sensor components, rotation sensor components (e.g., gyroscope).

The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 further include communication components 1236 operable to couple the machine 1200 to a network 1238 or devices 1240 via respective coupling or connections. For example, the communication components 1236 may include a network interface component or another suitable device to interface with the network 1238. In further examples, the communication components 1236 may include wired communication components, wireless communication components, cellular communication components, Near Field Communication (NFC) components, Bluetooth™ components (e.g., Bluetooth™ Low Energy), Wi-Fi components, and other communication components to provide communication via other modalities. The devices 1240 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1216, static memory 1218, and memory of the processors 1204) and storage unit 1220 may store one or more sets of instructions and data structures (e.g., software) embodying or used by any one or more of the methodologies or functions described herein. These instructions (e.g., the instructions 1202), when executed by processors 1204, cause various operations to implement the disclosed examples.

The instructions 1202 may be transmitted or received over the network 1238, using a transmission medium, via a network interface device (e.g., a network interface component included in the communication components 1236) and using any one of several well-known transfer protocols (e.g., hypertext transfer protocol (HTTP)). Similarly, the instructions 1202 may be transmitted or received using a transmission medium via a coupling (e.g., a peer-to-peer coupling) to the devices 1240.

Software Architecture

Figure 13:
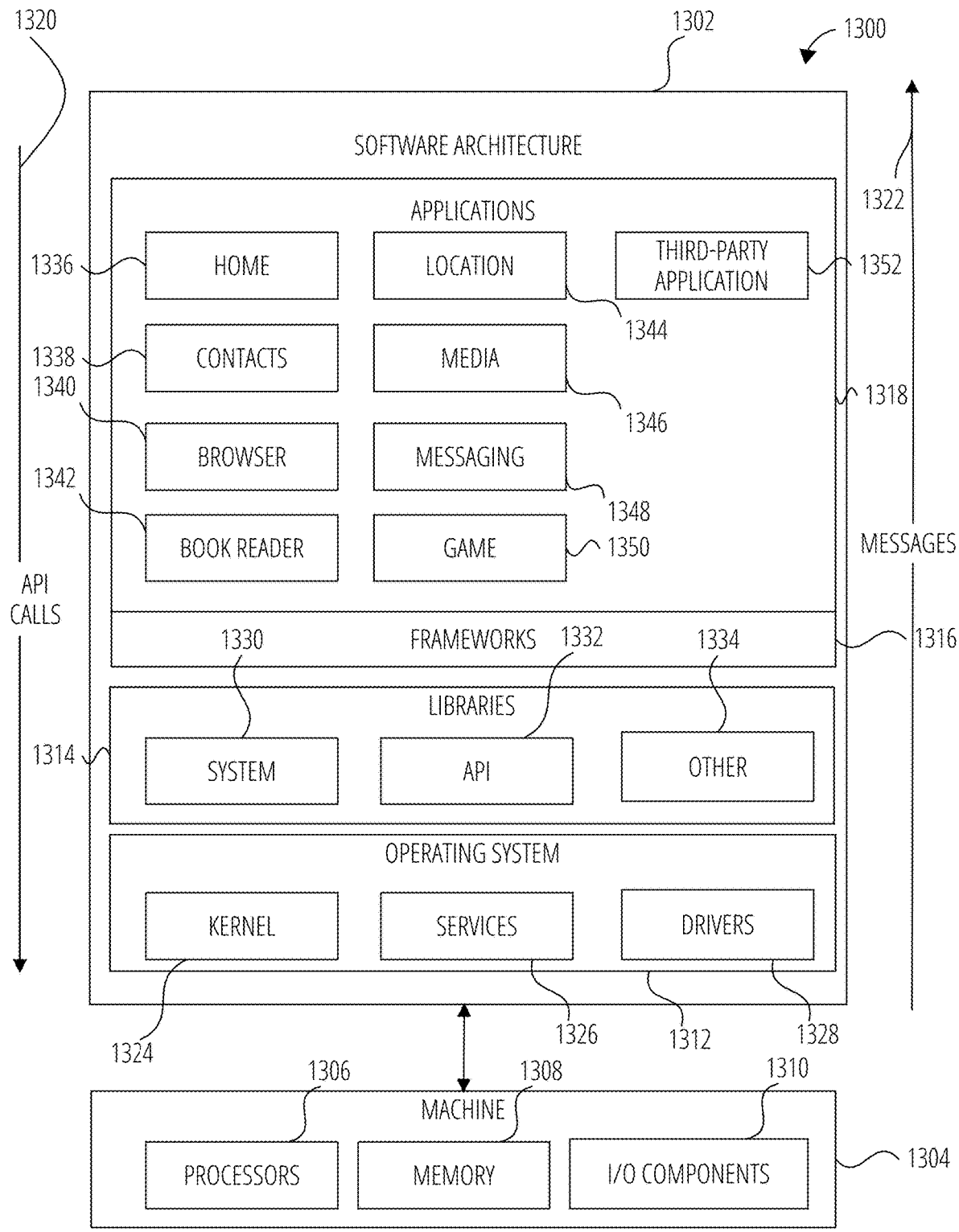
FIG. 13 is a block diagram showing a software architecture within which examples may be implemented.

FIG. 13 is a block diagram 1300 illustrating a software architecture 1302, which can be installed on any one or more of the devices described herein. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such as an operating system 1312, libraries 1314, frameworks 1316, and applications 1318. Operationally, the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 provides memory management, processor management (e.g., scheduling), component management, networking, and security settings, among other functionalities. The services 1326 can provide other common services for the other software layers. The drivers 1328 are responsible for controlling or interfacing with the underlying hardware. For instance, the drivers 1328 can include display drivers, camera drivers, Bluetooth™ or Bluetooth™ Low Energy drivers, flash memory drivers, serial communication drivers (e.g., USB drivers), WI-FI drivers, audio drivers, power management drivers, and so forth.

The libraries 1314 provide a common low-level infrastructure used by the applications 1318. The libraries 1314 can include system libraries 1330 (e.g., C standard library) that provide functions such as memory allocation functions, string manipulation functions, mathematic functions, and the like. In addition, the libraries 1314 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1314 can also include a wide variety of other libraries 1334 to provide many other APIs to the applications 1318.

The frameworks 1316 provide a common high-level infrastructure that is used by the applications 1318. For example, the frameworks 1316 provide various graphical user interface (GUI) functions, high-level resource management, and high-level location services. The frameworks 1316 can provide a broad spectrum of other APIs that can be used by the applications 1318, some of which may be specific to a particular operating system or platform.

In an example, the applications 1318 may include a home application 1336, a contacts application 1338, a browser application 1340, a book reader application 1342, a location application 1344, a media application 1346, a messaging application 1348, a game application 1350, and a broad assortment of other applications such as a third-party application 1352. The applications 1318 are programs that execute functions defined in the programs. Various programming languages can be employed to create one or more of the applications 1318, structured in a variety of manners, such as object-oriented programming languages (e.g., Objective-C, Java, or C++) or procedural programming languages (e.g., C or assembly language). In a specific example, the third-party application 1352 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1352 can invoke the API calls 1320 provided by the operating system 1312 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: retrieving sticker selection history data of a user of an interaction application; detecting absence of a sticker suggestion trigger with respect to a messaging interface of the interaction application, wherein presence of the sticker suggestion trigger results in presentation of a suggested sticker for transmission via the messaging interface; selecting, based on the sticker selection history data and the absence of the sticker suggestion trigger, a sticker search icon state; and causing presentation, within the messaging interface, of a search icon corresponding to the sticker search icon state.

In Example 2, the subject matter of Example 1 includes, wherein the sticker search icon state is selected from among a plurality of sticker search icon states of the interaction application, the plurality of sticker search icon states comprising at least one of a non-preview state or a preview state.

In Example 3, the subject matter of Examples 1-2 includes, wherein detecting the absence of the sticker suggestion trigger comprises detecting absence of a sticker suggestion generated for a user conversation within the messaging interface.

In Example 4, the subject matter of Examples 1-3 includes, wherein detecting the absence of the sticker suggestion trigger comprises determining that an input field of the messaging interface is empty.

In Example 5, the subject matter of Examples 1-4 includes, wherein the sticker selection history data identifies one or more stickers used by the user within a determinable time period.

In Example 6, the subject matter of Example 5 includes, wherein the sticker search icon state is a preview state.

In Example 7, the subject matter of Example 6 includes, wherein the search icon corresponding to the preview state is a sticker selected from the one or more stickers used by the user within the determinable time period.

In Example 8, the subject matter of Examples 5-7 includes, wherein causing presentation of the search icon corresponding to the sticker search icon state comprises: identifying a most recently used sticker from the one or more stickers used by the user in the determinable time period; and causing presentation of the most recently used sticker as the search icon within the messaging interface.

In Example 9, the subject matter of Examples 5-8 includes, the operations further comprising: receiving user input to select the search icon within the messaging interface; and responsive to receiving the user input to select the search icon, causing presentation, within the messaging interface, of a sticker search graphical element that presents one or more user-selectable stickers.

In Example 10, the subject matter of Example 9 includes, wherein the one or more stickers identified by the sticker selection history data correspond to the one or more user-selectable stickers presented by the sticker search graphical element within the messaging interface.

In Example 11, the subject matter of Example 10 includes, wherein the one or more user-selectable stickers presented by the sticker search graphical element within the messaging interface are presented in a recent stickers section of the messaging interface.

In Example 12, the subject matter of Examples 9-11 includes, wherein the user is a sending user, and wherein the messaging interface enables the sending user to compose a message for transmission to at least one receiving user, the operations further comprising: receiving user input to select a sticker of the one or more user-selectable stickers presented within the messaging interface; and causing the selected sticker to be included in the message.

In Example 13, the subject matter of Examples 9-12 includes, wherein the sticker search graphical element comprises a user-navigable search panel in which the one or more user-selectable stickers are presented.

In Example 14, the subject matter of Example 13 includes, wherein the one or more user-selectable stickers are arranged within the search panel by sticker category.

In Example 15, the subject matter of Examples 1-14 includes, wherein the sticker selection history data indicates that the user has not used a sticker in a determinable time period, and wherein the sticker search icon state is a non-preview state.

In Example 16, the subject matter of Example 15 includes, wherein the search icon corresponding to the non-preview state is a non-user specific icon of the interaction application.

In Example 17, the subject matter of Examples 1-16 includes, wherein the search icon is presented together with an input field of the messaging interface.

In Example 18, the subject matter of Example 17 includes, the operations further comprising: detecting user input to populate the input field of the messaging interface with content; identifying the user input to populate the input field as the sticker suggestion trigger; and responsive to identifying the sticker suggestion trigger, causing the search icon to be replaced, within the messaging interface, by a suggested sticker that is based on the content.

Example 19 is a method comprising: retrieving sticker selection history data of a user of an interaction application; detecting absence of a sticker suggestion trigger with respect to a messaging interface of the interaction application, wherein presence of the sticker suggestion trigger results in presentation of a suggested sticker for transmission via the messaging interface; selecting, based on the sticker selection history data and the absence of the sticker suggestion trigger, a sticker search icon state; and causing presentation, within the messaging interface, of a search icon corresponding to the sticker search icon state.

Example 20 is a non-transitory computer-readable storage medium storing instructions that, when executed by at least one processor, cause the at least one processor to perform operations comprising: retrieving sticker selection history data of a user of an interaction application; detecting absence of a sticker suggestion trigger with respect to a messaging interface of the interaction application, wherein presence of the sticker suggestion trigger results in presentation of a suggested sticker for transmission via the messaging interface; selecting, based on the sticker selection history data and the absence of the sticker suggestion trigger, a sticker search icon state; and causing presentation, within the messaging interface, of a search icon corresponding to the sticker search icon state.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device," refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium"

and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"Sticker" refers, for example, to a type of digital content that may be used to convey emotions, reactions, moods, statements, views, or messages, within a message. While some stickers may be in the form of emojis, stickers are often larger and/or more expressive than regular emojis, and they may feature characters, illustrations, or animations. Stickers can be sent as standalone messages, or they can be added to a message to enhance its meaning or add a playful or creative element to the conversation. Some applications allow users to download and use custom sticker packs, while others offer a selection of built-in stickers. Some applications allow users to create their own custom or personal stickers.

"User device" refers, for example, to a device accessed, controlled, or owned by a user and with which the user interacts to perform an action, or interaction on the user device, including an interaction with other users or computer systems.

What is claimed is:

1. A system comprising:
   at least one processor; and
   at least one memory component storing instructions that, when executed by the at least one processor, cause the at least one processor to perform operations comprising:
   retrieving sticker selection history data of a user of an interaction application, the sticker selection history data comprising a most recently used sticker used by the user within a determinable time period;
   detecting absence of a sticker suggestion trigger with respect to a messaging interface of the interaction application, wherein presence of the sticker suggestion trigger results in presentation of a suggested sticker as a sticker search icon in the messaging interface, the sticker search icon is selectable to launch a sticker search, and the sticker search icon is distinct from a search results section of the messaging interface;
   identifying that a predetermined set of conditions is met, the predetermined set of conditions comprising presence of the most recently used sticker at the same time as the absence of the sticker suggestion trigger;
   in response to identifying that the predetermined set of conditions is met, selecting a preview state in which the most recently used sticker is to be applied as the sticker search icon; and
   based on the selected preview state, causing presentation of an image depicting the most recently used sticker as the sticker search icon in the messaging interface.

2. The system of claim 1, wherein detecting the absence of the sticker suggestion trigger comprises detecting absence of a sticker suggestion generated for a user conversation within the messaging interface.

3. The system of claim 1, wherein detecting the absence of the sticker suggestion trigger comprises determining that an input field of the messaging interface is empty.

4. The system of claim 1, the operations further comprising:
   receiving user input to select the sticker search icon within the messaging interface; and
   responsive to receiving the user input to select the sticker search icon, causing presentation, within the messaging interface, of a sticker search graphical element that presents one or more user-selectable stickers.

5. The system of claim 4, wherein the one or more user-selectable stickers presented by the sticker search graphical element within the messaging interface comprise a plurality of recent stickers that comprises the most recently used sticker.

6. The system of claim 5, wherein the one or more user-selectable stickers presented by the sticker search graphical element within the messaging interface are presented in a recent stickers section of the messaging interface.

7. The system of claim 4, wherein the user is a sending user, and wherein the messaging interface enables the sending user to compose a message for transmission to at least one receiving user, the operations further comprising:
   receiving user input to select a sticker of the one or more user-selectable stickers presented within the messaging interface; and
   causing the selected sticker to be included in the message.

8. The system of claim 4, wherein the sticker search graphical element comprises a user-navigable search panel in which the one or more user-selectable stickers are presented.

9. The system of claim 8, wherein the one or more user-selectable stickers are arranged within the search panel by sticker category.

10. The system of claim 1, wherein, at a first stage, the sticker selection history data indicates use of the most recently used sticker within the determinable time period, and the preview state is selected with respect to the first stage, the operations further comprising:
- selecting a non-preview state with respect to a second stage, the non-preview state being selected based on the absence of the sticker suggestion trigger and the sticker selection history data indicating, at the second stage, that the user has not used a sticker in the determinable time period.

11. The system of claim 10, wherein the sticker search icon corresponding to the non-preview state is a non-user specific icon of the interaction application.

12. The system of claim 1, wherein the sticker search icon is presented together with an input field of the messaging interface.

13. The system of claim 12, the operations further comprising:
- after causing presentation of the image depicting the most recently used sticker as the sticker search icon, detecting user input to populate the input field of the messaging interface with content;
- identifying the user input to populate the input field as the sticker suggestion trigger; and
- responsive to identifying the sticker suggestion trigger, causing the sticker search icon to be replaced, within the messaging interface, by an image of the suggested sticker that is based on the content.

14. A method comprising:
- retrieving sticker selection history data of a user of an interaction application, the sticker selection history data comprising a most recently used sticker used by the user within a determinable time period;
- detecting absence of a sticker suggestion trigger with respect to a messaging interface of the interaction application, wherein presence of the sticker suggestion trigger results in presentation of a suggested sticker as a sticker search icon in the messaging interface, the sticker search icon is selectable to launch a sticker search, and the sticker search icon is distinct from a search results section of the messaging interface;
- identifying that a predetermined set of conditions is met, the predetermined set of conditions comprising presence of the most recently used sticker at the same time as the absence of the sticker suggestion trigger;
- in response to identifying that the predetermined set of conditions is met, selecting a preview state in which the most recently used sticker is to be applied as the sticker search icon; and
- based on the selected preview state, causing presentation of an image depicting the most recently used sticker as the sticker search icon in the messaging interface.

15. The method of claim 14, further comprising:
- receiving user input to select the sticker search icon within the messaging interface; and
- responsive to receiving the user input to select the sticker search icon, causing presentation, within the messaging interface, of a sticker search graphical element that presents one or more user-selectable stickers.

16. The method of claim 15, wherein the one or more user-selectable stickers presented by the sticker search graphical element within the messaging interface comprise a plurality of recent stickers that comprises the most recently used sticker.

17. The method of claim 16, wherein the one or more user-selectable stickers presented by the sticker search graphical element within the messaging interface are presented in a recent stickers section of the messaging interface.

18. A non-transitory computer-readable storage medium storing instructions that, when executed by at least one processor, cause the at least one processor to perform operations comprising:
- retrieving sticker selection history data of a user of an interaction application, the sticker selection history data comprising a most recently used sticker used by the user within a determinable time period;
- detecting absence of a sticker suggestion trigger with respect to a messaging interface of the interaction application, wherein presence of the sticker suggestion trigger results in presentation of a suggested sticker as a sticker search icon in the messaging interface, the sticker search icon is selectable to launch a sticker search, and the sticker search icon is distinct from a search results section of the messaging interface;
- identifying that a predetermined set of conditions is met, the predetermined set of conditions comprising presence of the most recently used sticker at the same time as the absence of the sticker suggestion trigger;
- in response to identifying that the predetermined set of conditions is met, selecting a preview state in which the most recently used sticker is to be applied as the sticker search icon; and
- based on the selected preview state, causing presentation of an image depicting the most recently used sticker as the sticker search icon in the messaging interface.

19. The non-transitory computer-readable storage medium of claim 18, wherein the operations further comprise:
- receiving user input to select the sticker search icon within the messaging interface; and
- responsive to receiving the user input to select the sticker search icon, causing presentation, within the messaging interface, of a sticker search graphical element that presents one or more user-selectable stickers.

20. The non-transitory computer-readable storage medium of claim 19, wherein the one or more user-selectable stickers presented by the sticker search graphical element within the messaging interface comprise a plurality of recent stickers that comprises the most recently used sticker.

* * * * *